United States Patent
Smith et al.

(10) Patent No.: US 8,080,769 B2
(45) Date of Patent: Dec. 20, 2011

(54) CHARACTERIZATION OF AC MAINS CIRCUIT PARAMETERS

(75) Inventors: David E. Smith, Vancouver, WA (US); Kenneth B. Wade, Battle Ground, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 12/254,847

(22) Filed: Oct. 21, 2008

(65) Prior Publication Data

US 2009/0179626 A1 Jul. 16, 2009

Related U.S. Application Data

(60) Provisional application No. 61/010,671, filed on Jan. 10, 2008.

(51) Int. Cl.
 *G03G 15/00* (2006.01)
(52) U.S. Cl. ............................ 219/486; 399/335; 363/81
(58) Field of Classification Search .................. 323/222, 323/223, 225, 269, 255, 282–285, 299; 315/291, 315/307; 307/64, 66, 81, 125, 140, 105; 219/485–488, 508, 216; 399/69, 328, 330, 399/336
See application file for complete search history.

(56) References Cited

U.S. PATENT DOCUMENTS

| | | | |
|---|---|---|---|
| 4,806,838 A | 2/1989 | Weber | |
| 5,032,738 A * | 7/1991 | Vithayathil | 307/112 |
| 5,397,999 A | 3/1995 | Kanamaru | |
| 5,710,701 A | 1/1998 | Brown | |
| 5,969,952 A * | 10/1999 | Hayashi et al. | 361/774 |
| 6,459,175 B1 | 10/2002 | Potega | |
| 6,465,987 B1 | 10/2002 | Haas et al. | |
| 6,496,665 B2 | 12/2002 | Umezawa et al. | |
| 6,528,957 B1 | 3/2003 | Luchaco | |
| 6,552,565 B2 * | 4/2003 | Chang et al. | 326/30 |
| 6,565,176 B2 | 5/2003 | Anderson et al. | |
| 6,591,073 B1 | 7/2003 | Fujii | |
| 6,601,001 B1 | 7/2003 | Moore | |
| 6,688,719 B2 | 2/2004 | Silverbrook et al. | |
| 6,787,050 B2 | 9/2004 | Parish | |
| 6,795,103 B2 | 9/2004 | Okayasu et al. | |
| 6,868,623 B2 | 3/2005 | Bjornberg | |
| 6,879,178 B1 | 4/2005 | Kantorovich et al. | |
| 6,930,293 B2 * | 8/2005 | Matsuo et al. | 219/664 |
| 6,943,326 B2 | 9/2005 | Hirst | |
| 6,957,161 B2 | 10/2005 | Allen et al. | |
| 7,044,571 B2 | 5/2006 | Smith et al. | |
| 7,142,993 B2 * | 11/2006 | Smith et al. | 702/61 |
| 7,149,902 B2 | 12/2006 | Ryu | |
| 7,161,415 B2 | 1/2007 | Oliver, Jr. | |
| 7,233,112 B2 * | 6/2007 | Burke et al. | 315/209 R |
| 7,291,984 B2 * | 11/2007 | Ballenger et al. | 315/246 |
| 7,528,625 B2 * | 5/2009 | Ozasa et al. | 326/30 |
| 2002/0140964 A1 | 10/2002 | Goto et al. | |
| 2002/0149637 A1 | 10/2002 | Miyakoshi et al. | |
| 2002/0162080 A1 | 10/2002 | Takahashi et al. | |
| 2002/0188876 A1 | 12/2002 | Forbes et al. | |
| 2003/0079150 A1 | 4/2003 | Smith et al. | |
| 2003/0085621 A1 | 5/2003 | Potega | |
| 2003/0193538 A1 | 10/2003 | Silverbrook et al. | |
| 2003/0202813 A1 | 10/2003 | Schoedinger | |

(Continued)

*Primary Examiner* — Rajnikant Patel

(57) ABSTRACT

Methods, devices, and systems implementing AC mains circuit parameter characterization are provided. One example embodiment of an image forming device includes a variable electrical load, and a controller adapted to vary the electrical load based on a characterization of AC mains circuit parameters including source voltage and line impedance wherein line impedance is determined for a change in source voltage.

24 Claims, 12 Drawing Sheets

U.S. PATENT DOCUMENTS

| | | |
|---|---|---|
| 2004/0003299 A1 | 1/2004 | Malueg et al. |
| 2004/0003300 A1 | 1/2004 | Malueg et al. |
| 2004/0028422 A1 | 2/2004 | Umezawa et al. |
| 2004/0039960 A1 | 2/2004 | Kassayan |
| 2004/0084971 A1 | 5/2004 | Shukla et al. |
| 2004/0095115 A1 | 5/2004 | Kernahan et al. |
| 2004/0139038 A1 | 7/2004 | Ehlers et al. |
| 2004/0139360 A1 | 7/2004 | Bliley et al. |
| 2004/0151513 A1 | 8/2004 | Nomura |
| 2004/0184208 A1 | 9/2004 | Liu |
| 2004/0187042 A1 | 9/2004 | Kawanabe |
| 2004/0246512 A1 | 12/2004 | Miyamoto |
| 2005/0088678 A1 | 4/2005 | Namura |
| 2005/0102539 A1 | 5/2005 | Hepner et al. |
| 2005/0138438 A1 | 6/2005 | Bodas |
| 2005/0237370 A1 | 10/2005 | Elgee et al. |
| 2005/0278556 A1 | 12/2005 | Smith et al. |
| 2008/0103609 A1 | 5/2008 | Smith |

\* cited by examiner

102

CHARACTERIZATION OF AC MAINS CIRCUIT PARAMETERS

CROSS REFERENCE TO RELATED APPLICATIONS

This Application claims the benefit of provisional patent application Ser. No. 61/010,671, filed Jan. 10, 2008 titled "CHARACTERIZATION OF AC MAINS CIRCUIT PARAMETERS" which application is incorporated by reference herein as if reproduced in full below.

INTRODUCTION

Electrical devices and/or systems receive electrical power from a power source. A typical example of a power source (e.g., an alternating current (AC) power source) is a remotely-located generator, connected to the device and/or system through a number of transmission lines, transformers, and other power distribution equipment. An AC power source and the connecting supply lines are sometimes collectively referred to as the AC mains.

If a voltage magnitude of an external power source drops too much, and/or current flow causes too much voltage drop through the AC mains circuit impedance, then insufficient voltage may be available at the system and/or device for proper operation thereof. For example, low voltage from the AC mains can cause an internal direct current (DC) power supply to shut down or produce low DC voltage, which in turn may cause electronic components to fail or mis-operate. Therefore, some limit of maximum power exists for which a system and/or device can draw from the AC mains without depressing the voltage past a threshold needed for proper operation.

When an electrical system, device, or component changes the amount of power drawn, such as when it switches on or off, power drawn from the power source fluctuates. Such a changing power load draws fluctuating current from the power source through the finite impedance of the electrical supply circuit, causing voltage to fluctuate on the supply circuit. This phenomenon of fluctuating power is often referred to as flicker.

DETAILED DESCRIPTION

Figure 1A:
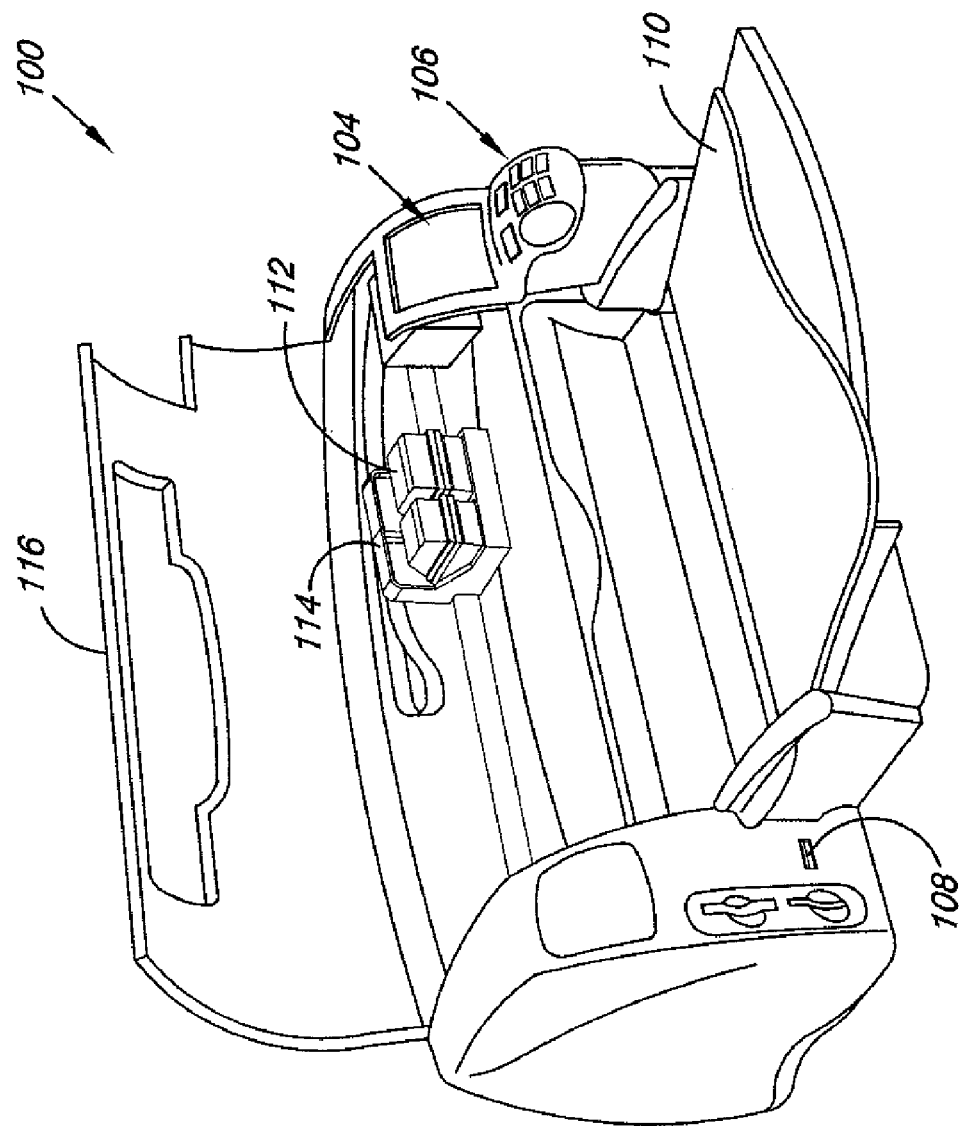
FIG. 1A illustrates an embodiment of an image forming device according to one or more embodiments of the present disclosure.

Methods, devices, and systems implementing AC mains circuit parameter characterization are provided. One example embodiment of an image forming device includes a variable electrical load, and a controller adapted to vary the electrical load based on a characterization of AC mains circuit parameters including source voltage and line impedance wherein line impedance is determined for a change in source voltage, e.g., exceeding a selected value, percentage, or other threshold change characteristic.

As discussed herein, a power source may be from an alternating current (AC) supply, e.g., a connection to the utility power grid, or from an AC power supply or a direct current (DC) power supply driven from an AC supply, e.g., a DC power supply internal to the electrical device or from batteries. Supply lines connect the power source to the device and/or system being energized.

A typical example of an AC power source is a remotely-located generator, connected to the device and/or system through a number of transmission lines, transformers, and other power distribution equipment. An AC power source and the connecting supply lines are sometimes collectively referred to as the AC mains.

The AC mains can be characterized, i.e., modeled in a particular manner, by an equivalent voltage source and circuit impedance. Kirchoff's laws regarding relationships between current and voltage can be used to predict electrical performance of the system and/or device using the AC mains characterization when applied to the properties of a particular electrical load When in operation, an electrical load, e.g., a system or device or component of a device, draws power from the power source, e.g., from the equivalent voltage source through the equivalent circuit impedance. Current through the equivalent circuit impedance causes a voltage drop to the system and/or device.

The system and/or device utilizes a certain minimum voltage, e.g., at its terminals or at the input to its internal power supply, to operate properly. If the voltage magnitude of the external power source drops too much, and/or current flow causes too much voltage drop through the AC mains circuit impedance, then insufficient voltage will be available at the system and/or device for proper operation thereof.

For example, low voltage from the AC mains can cause an internal DC power supply to shut down or produce low DC voltage, which in turn may cause electronic components to fail or mis-operate. Therefore, some limit of maximum power exists for which a system and/or device can draw from the AC mains without depressing the voltage past a threshold needed for proper operation.

A system and/or device may be composed of a number of sub-systems, internal devices, and/or components. The maximum power draw limit on the AC mains may be an aggregate limit for all of the sub-systems, internal devices, and/or components.

However, the maximum power draw limit on the AC mains may be less than the sum total of the power drawn by all sub-systems, internal devices, and/or components simultaneously. Thus, power usage of individual sub-systems, internal devices and/or components may be controlled, coordinated, or otherwise limited, e.g., by a controller, such that total power usage at any given time remains within the maximum power draw limit.

As discussed above, when an electrical system, device, or component changes the amount of power drawn, such as when it switches on or off, power drawn from the power source fluctuates. Such a changing power load draws fluctuating current from the power source through the finite impedance of the electrical supply circuit, causing voltage to fluctuate on the supply circuit.

This phenomenon of fluctuating power is often referred to as flicker. Voltage fluctuations can result from internal or external changes in power usage. For example, if the AC mains circuit provides power to other electrical systems and/or devices, power changes associated with these other systems and/or devices, or changes to the voltage source itself, can cause fluctuating voltage that affects the function of systems, devices, and/or components connected to the AC mains electrical circuit.

AC electrical systems typically operate at 50 or 60 Hz, i.e., cycles per second. The average amplitude over one cycle of an AC electrical signal is zero, so AC electrical signals, e.g., current, voltage, power, etc., are conventionally measured by a root-mean-square (RMS) methodology. RMS amplitude is the square root of the average of the square of the instantaneous amplitude taken over some measuring duration, or time period.

Pulse width modulation (PWM) is one method for adjusting and/or controlling electrical power to a system, device, and/or component. In a basic implementation, a source of power to a system, device, or component is switched on and off, permitting power to flow to a device for some portion of time.

For example, full power may be allowed to flow to the system, device, or component twenty percent (20%) of the time, e.g., 20% PWM, with the power source to the system, device, or component being interrupted the remainder of the time, e.g., 80% of the time. Other power modulation schemes are also known that likewise limit power flow to a system, device, or component to some fraction, or portion, of the total available power.

For example, power may flow to a system, device, or component continuously, e.g., uninterrupted in duration, but have a reduced, or clipped, amplitude limited to a level that similarly provides some percentage of the total power available. Various other power modulation techniques and schemes to control power usage are known.

As used herein, "AC mains" refers to an alternating current (AC) source of power (i.e., power source) located external to an electrical device. For example, an electrical device may be plugged into an AC branch distribution circuit, and everything electrically "upstream" from the electrical device is denoted herein as the AC mains.

As used herein, "power supply" refers to a source of power located internal to the electrical device. A power supply is typically a component of the electrical device used to transform, and/or rectify or otherwise condition power received to the electrical device, e.g., from the AC mains. A power supply may output AC power; however, unless specifically mentioned to the contrary, a power supply as used herein, refers to a direct current (DC) power supply, e.g., receiving AC power and outputting DC power. A power supply, as used herein, is typically energized from the AC mains, and usually delivers a lower voltage supply voltage to internal components and systems of the device. Where an AC power supply supplies AC power to internal components, such supply path is referred to herein as an AC bus, AC bus supply, AC supply, etc., with "AC mains" being reserved to denote an external circuit for providing AC power to the device itself.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

In the figures, the first digit of a reference number refers to the Figure in which it is used, while the remaining two digits of the reference number refer to the same or equivalent parts of embodiment(s) of the present disclosure used throughout the several figures. The scaling of the figures does not represent precise dimensions and/or dimensional ratios of the various elements illustrated herein.

Figure 1B:
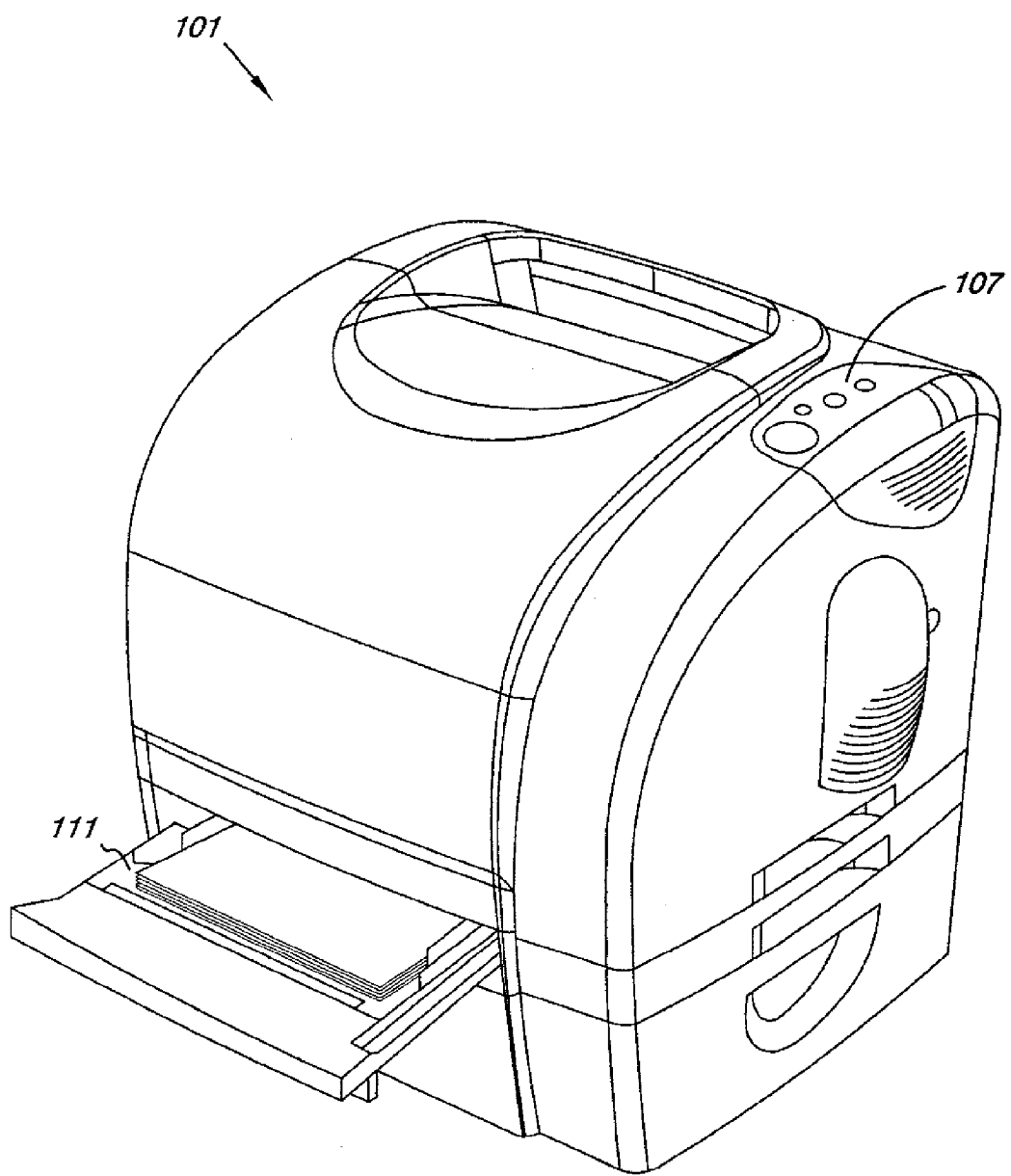
FIG. 1B illustrates another embodiment of an image forming device according to one or more embodiments of the present disclosure.
Figure 1C:
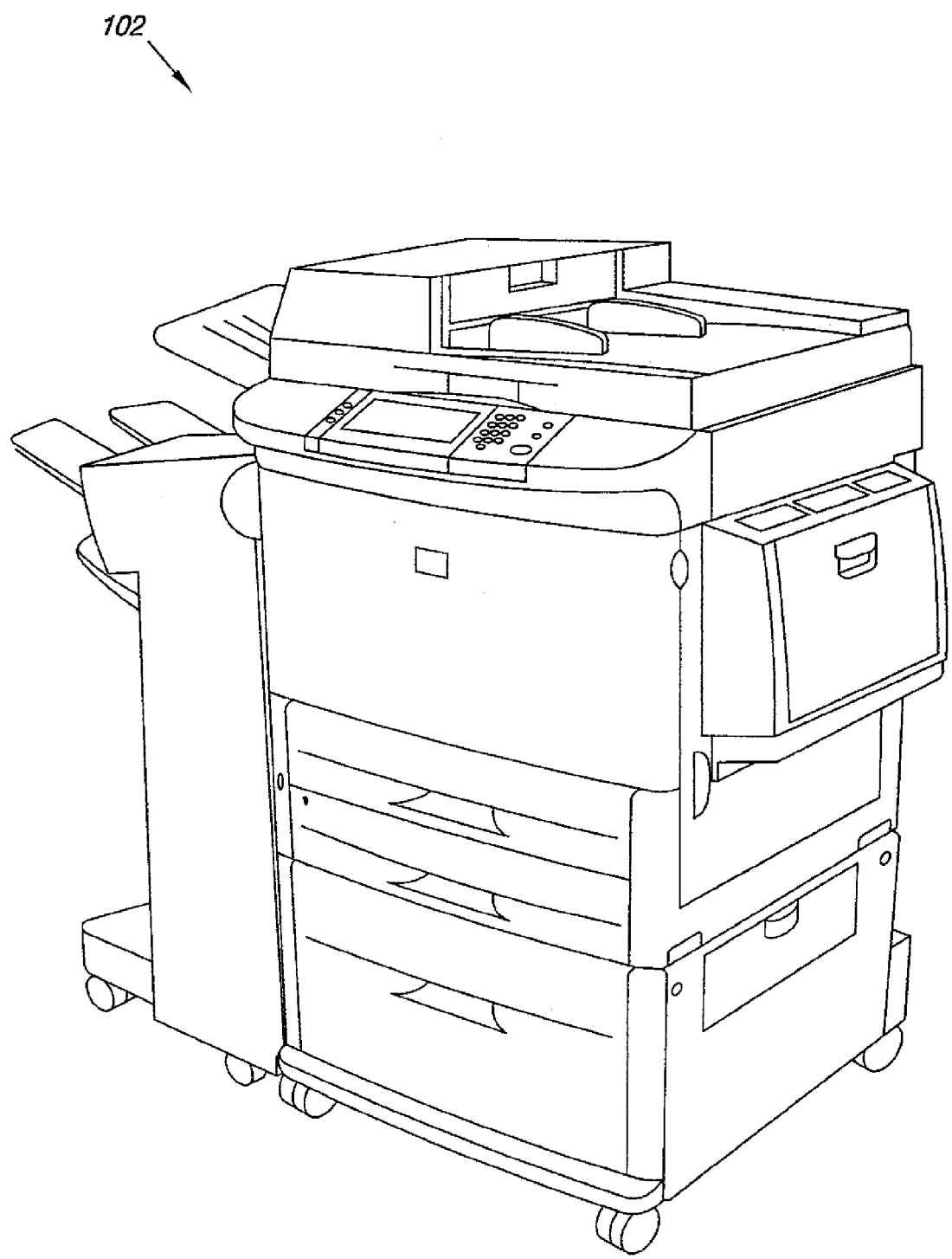
FIG. 1C illustrates another embodiment of an image forming device according to one or more embodiments of the present disclosure.

FIGS. 1A-1C illustrate various example devices for forming images on media, e.g., printing devices, in which one or more embodiments of the present invention can be implemented. However, embodiments of the present invention are not so limited to use with the illustrated devices, nor are they limited to use with printing devices, and may be implemented in any electrical system or device connected, or coupled, to an external power source, e.g., AC mains, or internal power supply.

FIG. 1A provides a perspective illustration of an embodiment of an image forming device 100 which is operable to implement, or which can include, embodiments of the present invention. The image forming device 100 illustrated in FIG. 1A is an inkjet printing device. As shown, the image forming device 100 includes a display 104, a number of user interface input/outputs (I/O), control mechanisms such as a control console 106 with an input keypad for data entry, and an I/O port 108 for receiving data. Not shown, and typically located on the rear of the printing device, are other communication and electrical power supply connections to the printing device 100. The printing device 100 can operate as a stand alone device and/or can be used as a printing device in a networked system.

In the embodiment shown in FIG. 1A, the printing device 100 includes a print media supply tray 110 used to hold print media upon which images are formed, e.g., printed. In conjunction with the print media supply tray 110, the printing device 100 can include conveyance mechanisms for conveying the print media past the printheads. Such conveyance mechanisms can include rollers, drums, motors, and the like. Printing device 100 also includes at least one print cartridge 112 mounted in a movable print carriage 114 within device housing 116. The print cartridge 112 may contain both an ink reservoir and a printhead for ejecting ink onto print media. The movable print carriage 114 can move to scan the print cartridge 112 across the print media while performing a print job. Embodiments of the invention, however, are not limited to ink jet printers, and/or image forming devices having a movable print carriage. For example, one or more embodiments of the present invention may be implemented in inkjet printing devices, or laser/light emitting diode printing devices, in which print media moves underneath a stationary print cartridge.

FIG. 1B illustrates another embodiment of an image forming device 101, e.g., a LaserJet printer, having faster printing speed and greater volume capabilities, which is operable to implement, or which can include, embodiments of the present invention. The image forming device 101 includes a control console 107 provided to a user on the top of the device 101 and one or more print media supply trays 111 provided underneath, and can include other features discussed above with regard to FIG. 1A. The console 107 can be used to enter information into the image forming device 101. Additionally, image forming device 101 can include a drum media conveyance mechanism in which the print media moves in a curved path past a print depositing mechanism, e.g., printheads.

FIG. 1C illustrates another embodiment of an image forming device 102 which is operable to implement, or which can include, embodiments of the present invention. Image forming device 102 is, for example, a multifunction printer 102, e.g., having printing, copying, scanning, and faxing capabilities. Image forming device 102 may have even greater print speed and volume capabilities than the printers discussed previously. Image forming device 102 may also include a drum media conveyance mechanism, and one or more of the other features described above. One or more embodiments of the present invention are not limited to the example image forming devices illustrated in FIGS. 1A-1C, and may include for example, fax machines, copy machines, scanners, plotters, and the like. Electric systems and/or devices embodiments operable to implement, or which can include, embodiments of the present invention may be implemented, or included, in a wide range of electric systems and/or devices connected, or coupled, to a power source, e.g., AC mains.

Functional embodiments operable to implement, or which can include, embodiments of the present invention, may include various types of printing devices each respectively having one or more internal electrical load components. For example, one type of inkjet printing device has a print media dryer. In such devices, each component of the device can have a defined minimum and maximum power that it can drawn from a power source, e.g., AC mains. Additionally, the device can have an aggregate minimum and maximum power that it is rated to draw from a power source, or the power source can have a maximum amount of power that it can provide. One way to estimate the amount of power that a device will use is to calculate the sum of the maximum amounts drawn from components that could be drawing power from the power source at the same time. In this way, the calculation can provide the total maximum power that the device could draw at any given time. Power draw limits may also be set so as to avoid causing flicker or other voltage disturbances exceeding some threshold.

However in some cases, components, like the dryer component in such devices, can draw a significant amount of power in providing their function, e.g., proper drying of the ink deposited on print media. In the case of a media dryer, the amount of power used to ensure proper drying can, in some cases, be more than the maximum amount of power available from the external power source, e.g., AC mains, or may exceed the maximum amount of power available from the internal power supply if used in aggregate with other internal loads. Thus, the amount of power available to some components may be limited when certain other components are also drawing power, and the power may be available to some components when certain other components are not using power simultaneously.

One or more embodiments of the present invention utilize energy measurement components, e.g., hardware and firmware, embedded in an electrical device to characterize an AC mains circuit parameters, e.g., equivalent source voltage and circuit impedance, to aid in power management of the electrical device. One or more embodiments of the present invention provide techniques for evaluating the quality of available power supply capabilities, and measuring characterizing electrical signals indicative of these capabilities. One or more embodiments of the present invention provide mechanisms to manage power usage of an electrical device or system, for example by allocating power to one or more power consumption components, such as a media dryer, based on a characterization of the AC mains. One or more embodiments of the present invention can also be used to reduce the variation in the amount of power drawn in order to reduce the potential for flicker, and adapt device power usage to changing AC mains circuit configurations and capabilities accordingly.

By way of illustration, and not of limitation, an image forming device will be utilized herein as an example platform by which to practice one or more embodiments of the present invention. One having ordinary skill in the art will appreciate that aspects and features set forth herein with respect to an image forming device, may be utilized in many other electrical devices which could benefit from the features described in the present disclosure.

Figure 2:
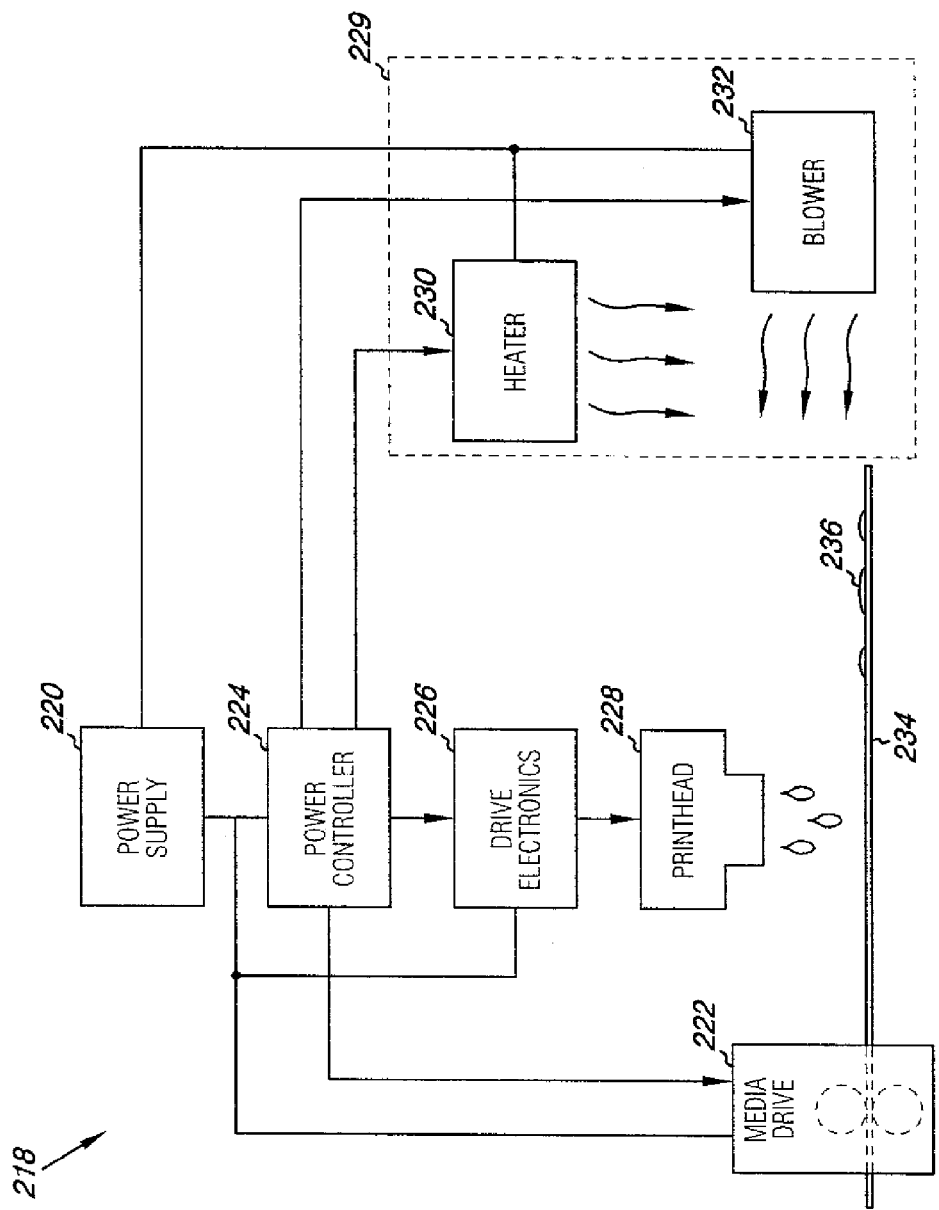
FIG. 2 illustrates a block diagram of an electrical circuit of an image forming mechanism according to one or more embodiments of the present disclosure.

FIG. 2 illustrates an embodiment of an image forming mechanism 218 including a number of representative electric and electronic components. An electrical device, such as an image forming device for example, may include an image forming mechanism 218. Image forming mechanism 218 is but one embodiment of a variable electrical load which may be embodied within an electrical device. Image forming mechanism 218, as might be included in one or more of the image forming devices illustrated in FIGS. 1A-1C, may have some, all, different, or more electric and electronic components than those shown in FIG. 2.

Image forming mechanism 218 includes a media marking mechanism, e.g., printhead 228, a power supply 220, media drive 222, power controller 224, drive electronics 226, and a media dryer 229. Media dryer 229, as shown in FIG. 2, is implemented by heater 230 warming air generated by blower 232; however, embodiments of the present invention are not so limited and may include other implementations of media drying and/or image fixing technologies. An image forming device, e.g., 100-102 in FIGS. 1A-1C, and/or image forming mechanism 218 may include other electronic components (not individually shown) such as a processor, memory, I/O channel, interface electronics, formatter, and/or other control electronics. These may be implemented separately, or as part of one or more of the components shown in FIG. 2. Electronic components of an image forming device or image forming mechanism can also include control logic in the form of executable instructions which, for example, can exist within a memory, and can be executed by a controller and/or processor, as will be understood by those having ordinary skill in the art. Generally, the executable instructions can be used to carry out various control steps and functions for the image forming device and/or image forming mechanism 218, such as to eject ink drops 236 onto the print media 234, move the print media 234, operate the media dryer (e.g., heater 230 and/or blower 232), and other such functions associated with image forming.

Memory, as referred to above, can include some combination of ROM, RAM, magnetic media, and optically read media, and/or nonvolatile and writeable memory such as battery-backed, or flash, memory. A processor can be operable on software, e.g., computer executable instructions, received from memory and/or via an input/output (I/O) channel. The embodiments of the present invention, however, are not limited to a specific type or number of processors or controllers, or to any particular type or amount of memory, and are not limited to where within a device or networked system these components or a set of computer instructions reside for use in implementing the various embodiments of the present invention.

The processor can be interfaced, or connected, to receive instructions and data from a remote device, e.g., over a local area and/or wide area network (LAN/WAN), through one or more I/O channels or ports. I/O channel can include a parallel or serial communications port, and/or a wireless interface for receiving data and information, e.g. print job data, as well as other computer executable instructions, e.g., software routines. The I/O channel can also include ports and/or slots, such as a USB port or a memory card slot for use with memory devices such as memory cards, sticks, disks, and the like.

Interface electronics are associated with the image forming mechanism 218 to interface between the control logic components and the electromechanical components of the printer such as the printhead 228, formatter/control electronics, and/or media dryer 229. Interface electronics can be coupled to electromechanical components in any suitable manner to control the operation thereof.

As is the case with many electronic devices, components and subsystems, a certain minimum power supply capacity, e.g., internal DC power supply energized from AC mains, is used for proper functioning. For example, one skilled in the art will appreciate that power supply 220 shown in FIG. 2 may be a DC power supply, which receives power from an AC source, such as AC mains (connection not shown in FIG. 2). If AC mains voltage available to the image forming device, or image forming mechanism, drops too low, the DC power supply may shut down, or may continue to operate but with a depressed output voltage such that one or more electronic components connected thereto may fail or mis-operate.

Media marking mechanisms, such as printhead 228, can be of various forms, and the illustration in FIG. 2 is intended to be representative, and not intended to be limiting. For example, many printheads 228 have a number of nozzles thereon that are electrically controlled to fire ink or another marking medium, e.g., 236, onto print media, e.g., 234. Some printheads use heaters during the process of preparing the ink to fire from the nozzle. In such devices, the number of nozzles firing and the duration and time between firing can affect the amount of power used by the printhead, e.g., 228. In addition, printheads generally include some control firmware that also uses power in calculating when to fire each nozzle and to perform other printing functions.

Certain image forming components tend to use a relatively fixed amount of power. However, based upon ambient conditions, such as temperature, humidity, age of the component, duration of use, print media throughput, and the like, the components can be somewhat variable in their amount of power usage. The amount of power that these components use can also vary based upon their on/off state. Media dryers, e.g., 229, are used to dry ink or other marking media, e.g., 236, used to mark print media, e.g., 234. A media dryer 229 can include heating elements 230, fans/blowers 232, sensors, and other electrically driven elements. According to one or more embodiments of the present invention, it is to be understood that a media dryer 229 is not limited to a literal drying function, as such a media dryer may also be a heating element utilized to fuse dry toner powder to a print media, and other such image-fixing components.

Components such as media dryers, e.g., 229, can draw a significant amount of power in order to provide their function (e.g., proper drying of the ink deposited on print media). One or more embodiments of the present invention include a method used for managing, e.g., coordinating, power usage of various components of a device or system, by determining how much power is available from the external source of power, e.g., AC mains, as an input consideration for controlling, e.g., modulating, one or more power consumption components such as those with large power usage, e.g., a media dryer 229.

Figure 3A:
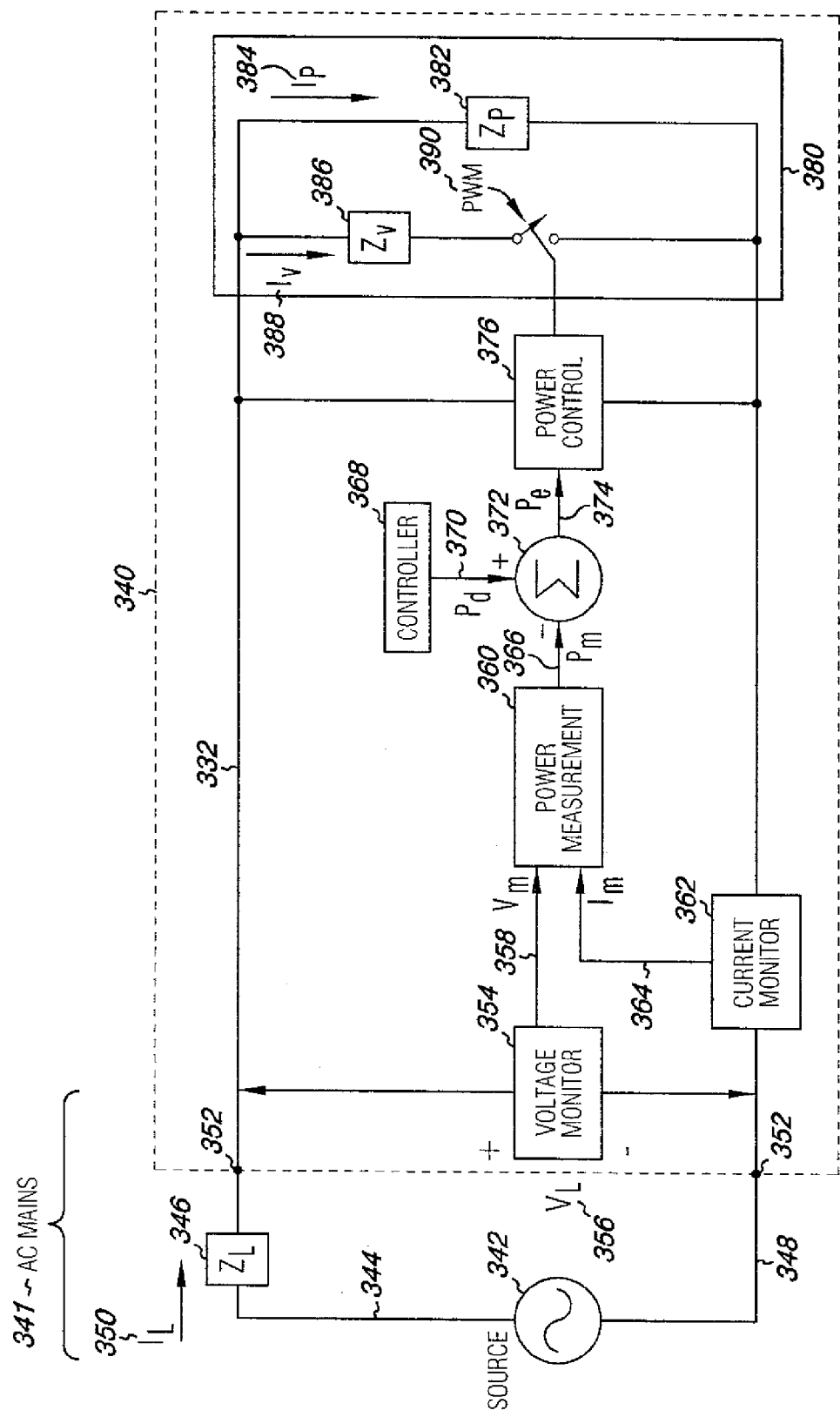
FIG. 3A illustrates an electrical diagram of a device having an image forming mechanism and connected to an AC mains according to one or more embodiments of the present disclosure.

FIG. 3A illustrates a block diagram of a device 340 having an image forming mechanism, e.g., 380, according to one or more embodiments of the present disclosure, the device 340 being connected to an AC mains 341. The AC mains circuit 341 shown in FIG. 3A includes a power source, e.g., voltage source 342, "hot" 344 and neutral 348 lines to the terminals 352 of the device 340. Impedance of the "hot" 344 and neutral 348 lines are combined and represented by line impedance ($Z_L$) 346. Lines 344 and 348 convey power from the voltage source 342 to terminals 352 of the device 340. The voltage source 342 and line impedance 346 shown in the circuit of FIG. 3A are intended to represent an equivalent AC mains source voltage and line impedance circuit parameters by which the actual parameters of the power source serving the device 340, e.g., the utility generation and transmission and distribution system, etc., can be modeled, simplified, and/or summarized, as will be understood by those having ordinary skill in the art. AC mains line current ($I_L$) 350 is shown flowing from the voltage source 342, through the line impedance ($Z_L$) 346, to the device 340. The reader will appreciate that line current ($I_L$) 350 is AC current with all the associated cyclic attributes, and thus current direction is assigned for purposes of electrical analysis, e.g., using RMS values of characterizing electrical signals.

Thus, line current ($I_L$) 350 flowing from the voltage source 342 through the line impedance ($Z_L$) 346, causes an associated voltage drop, resulting in a line voltage ($V_L$) 356 being present across terminals 352 to the device 340. The reader will appreciate that changes to the magnitude of the voltage source 342, the line current ($I_L$) 350, and/or the line impedance ($Z_L$) 346 will cause line voltage ($V_L$) 356 to change, e.g., fluctuate or flicker, as well.

Power from the AC mains 341 is received by the device 340 at terminals 352 and conveyed to internal loads via internal lines, e.g., conductor 332. Line voltage ($V_L$) 356 can be measured and/or monitored by a voltage monitor 354. A power measurement component 360 is communicatively coupled to the voltage monitor 354 by voltage signal path 358, receiving a measured voltage signal ($V_M$) therefrom. Likewise, line current ($I_L$) 350 can be measured and/or monitored by a current monitor 362, which is also communicatively coupled to power measurement component 360 by current signal path 364. Power measurement component 360 receives a measured current signal ($I_M$) from the current monitor 362.

From the measured voltage and current signals, the power measurement component 360 determines a measured power signal ($P_M$) which is communicated to a comparator 372 via signal path 366. The measured power signal ($P_M$) is compared to a demanded power signal ($P_D$) received from a controller 368 via signal path 370, e.g., by the comparator 372 or another comparing function, to arrive at a power difference, or error, signal ($P_E$) which is fed into a power controller 376 via signal path 374.

These measuring components can be provided in a single physical component (e.g., on a single computer chip), or multiple units. Such embodiments include a computer chip (e.g., for voltage monitoring, current monitoring, and power measurement functions) and firmware, such as on a central processor (e.g., for calculation of the power adjustment to be made by the power control component) for processing various functions of the device or system in addition to those related to the embodiments of the present invention. For instance, the power measurement components can be provided by computer executable instructions. In order to achieve a substantially constant draw from the AC mains 341, the error value $P_e$ should be near or equal to zero. In this way, the desired power level and the measured power level are substantially the same.

The power error signal ($P_E$) is communicated to a power controller 376, which is operable to control a switch 390. Switch 390 may be implemented in a variety of ways, for example by a mechanical, electric, or electronic power switch. Furthermore, switch may be implemented in such a manner that the power flowing through the impedance of the variable load ($Z_V$) 386 can be modulated, e.g., by pulse width modulation, etc. The power control 376 is used to allocate power to certain components, such as those that have high consumption. For example, high consumption components within an image forming device might include, but is not limited to, media dryers, vacuum systems (e.g., a media vacuum hold down system), media marking mechanisms (e.g., pens, print nozzles, and the like), and components of such components (e.g., motors, heaters, etc.), among others. Examples of components that can be implemented as power controllers and/or switch 390 include, but are not limited to, solid state switches, such as a Triode AC (TriAC) switch, power transistors, a silicon controlled rectifier (SCR), etc.

One having ordinary skill in the art will appreciate that when the switch 390 is closed, e.g., conducting, variable load ($Z_V$) 386 is effectively energized by line voltage ($V_L$) 356 (ignoring internal line drop from the terminals 352), and a current ($I_V$) 388 flows therethrough. A fixed load, represented by a product load impedance ($Z_P$) 382, is also effectively energized by line voltage ($V_L$) 356 (ignoring internal line drop from the terminals 352), causing a current ($I_P$) 384 to flow. Variable load ($Z_V$) 386 may represent one or more components of an image forming device, e.g., 100-102, an image forming mechanism, e.g., 384, such as high power consuming components including a print media dryer (heater 230 and/or blower 232 in FIG. 2), a media marking mechanism, and/or a vacuum hold-down system. Other variable loads may also be included in device 340, but are not shown here for simplicity of illustration. Other components also associated with an image forming mechanism are not shown in FIG. 3A for clarity.

Where variable load ($Z_V$) 386 is large relative to other circuit impedances, and due to the finite line impedance ($Z_L$) 346 of the AC mains, the switching of the variable load ($Z_V$) 386 can cause a measurable change in current drawn from the AC mains, and thus a measurable voltage drop across line impedance ($Z_L$) 346 and corresponding change in the line voltage ($V_L$) 356 at the terminals 352 of the device 340. If the mains voltage, e.g., line voltage ($V_L$) 356, drops below a threshold, the DC power supply of the device 340 or image forming mechanism 380, e.g., 220 in FIG. 2, may shutdown or fail to produce an adequate DC supply voltage, thereby disabling the device 340 and/or image forming mechanism 380.

Power controller 376 attempts to regulate, e.g., modulate, the power consumed at any given time by the variable load ($Z_V$) 386 to ensure that the total power draw of the device 340, e.g., by product load impedance ($Z_P$) 382 and variable load ($Z_V$) 386, and any other power consuming components, devices and/or sub-systems, will not cause line current ($I_L$) 350 to increase to a magnitude that causes the voltage drop across line impedance ($Z_L$) 346 to result in line voltage ($V_L$) 356 dropping below the threshold. In order to accomplish this effectively, device 340 has to have some information about the AC mains to which it is connected, e.g., plugged into.

One method by which device 340 can "learn" about the AC mains circuit parameters to which it is connected is by making measurements of AC mains voltage and current under two (2) different load conditions, from which the device can then characterize, e.g., solve for, AC mains circuit parameters, e.g., equivalent source voltage and circuit impedance. The device can then use the AC mains circuit parameters, along with knowledge of its own load characteristics, to avoid imposing loads on the AC mains that would lead to excessively high current draw, e.g., $I_L$ 350, and/or low input voltage, e.g., $V_L$ 356.

Previous approaches to characterizing the AC mains circuit parameters included applying purely sinusoidal loads, e.g., fixed test resistive loads, enabling measurement of corresponding pure RMS current and voltage signals. However for certain AC mains configurations, the fixed test resistive loads were too large, causing too much additional voltage change and resulting in device shutdown/failure as a result of the AC mains characterization testing. Conversely, as a more conservative approach, using fixed test resistive loads that are too small does not produce enough change in the AC mains circuit parameters, leading to inaccuracies in the estimation of AC mains circuit characteristic parameters. Such inaccuracies can lead to inefficient loading schemes, or inadvertent encroachment on voltage operating limits, again leading to device shutdown/failure.

In addition, previous approaches to AC mains circuit parameter characterization using small test loads might involve curtailing device performance for testing. Undue restriction of device performance during AC mains testing, inaccurate estimation of AC mains parameters, and risk of shutdown/failure during testing are potentialities of previous approaches to characterization of AC mains circuit parameters.

One solution to the above-mentioned challenges is to use a variable test load for measuring AC mains characterizing electrical signals, permitting adjustments to the particular test conditions utilized. Variable loading can be achieved by modulating a load for testing. By modulating significant functional loads, e.g., a print media dryer and/or a media marking mechanism and/or vacuum hold-down system, already present in the electrical device, separate additional test loads can be avoided. Furthermore, test loading is not limited to a separate and distinct operation. The AC mains can be sagged using functional loads during their normal, warm-up, or testing mode operations.

Figure 3B:
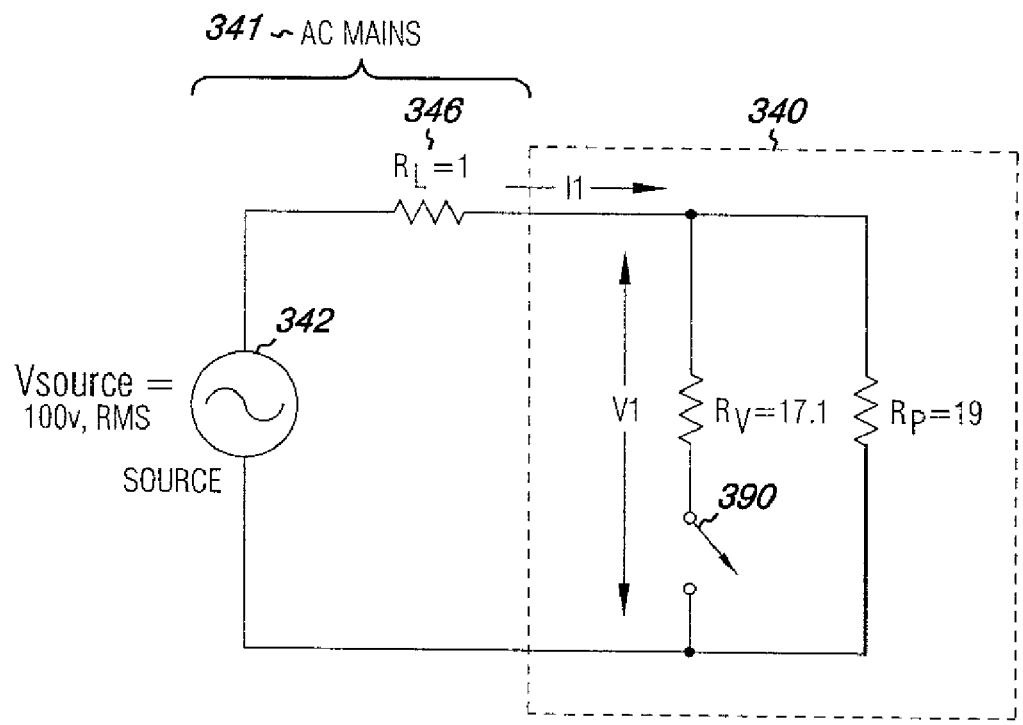
FIG. 3B illustrates a simplified electrical diagram of the device shown in FIG. 3A having a variable load switched-out according to one or more embodiments of the present disclosure.
Figure 3C:
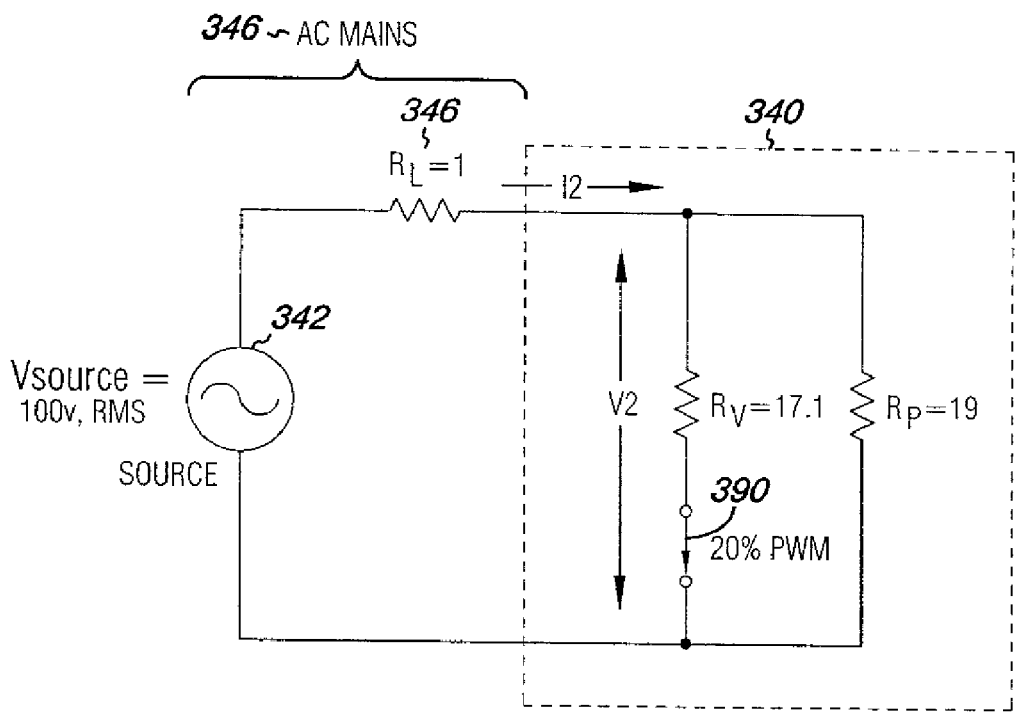
FIG. 3C illustrates another simplified electrical diagram of the device shown in FIG. 3A having a variable load switched-in according to one or more embodiments of the present disclosure.

FIGS. 3B and 3C illustrate a simplified version of the device 340 connected to the AC mains 341, as shown in FIG. 3A. For ease of illustration in this example, the AC mains source voltage is 100 V, RMS. The line impedance ($Z_L$) 346 is purely resistive, e.g., $R_L$, and equal to 1 ohm. The electrical loads of device 340 are also purely resistive, being modeled as a parallel combination of a modulated, e.g., variable, load ($R_V$) equal to 17.1 ohms, and a fixed product load ($R_P$) equal to 19 ohms. The particular load values chosen for this example are to simplify the associated calculations herein, and are not intended to represent actual impedance values, or be limiting on embodiments of the present invention in any way. For clarity in FIG. 3B, line current, e.g., $I_L$ 350 in FIG. 3A, is shown as being $I_1$ and line voltage, e.g., $V_L$ 356 in FIG. 3A, is shown as being $V_1$. And in FIG. 3C, the corresponding line current is shown as being $I_2$ and corresponding line voltage is shown as being $V_2$.

FIG. 3B illustrates the device 340 with the switch 390 open. Thus, variable load ($R_V$) is not drawing power, e.g., no heater resistance being used by an image forming mechanism. The device 340 measures:

$$I1 = 100\,V/(1+19\,\text{ohms}) = 5\,\text{Amps, RMS}$$

This creates a voltage drop across the AC mains line impedance, e.g., $R_L$:

$$\text{Line voltage drop} = 5\,\text{Amps} \times 1\,\text{ohm} = 5\,V, \text{RMS}.$$

Therefore, V1 equals the source voltage minus the line voltage drop:

$$V1 = 100\,V - 5\,V = 95\,V, \text{RMS}.$$

FIG. 3C illustrates the device 340 with the variable load ($R_V$) drawing power, e.g., heater resistance being used by an image forming mechanism. However, the variable load ($R_V$) is being modulated using a pulse width modulation (PWM) technique, which means the switch 390 is closing and opening rapidly, e.g., conducting and non-conducting rapidly. In this example, the variable load ($R_V$) is being modulated at approximately 20%, e.g., PWM=20%, meaning the variable load ($R_V$) is connected 20% of the time as indicated in FIG. 3C, and is disconnected 80% of the time. By use of an electronic switch, this modulation switching can occur very rapidly.

Figure 3D:
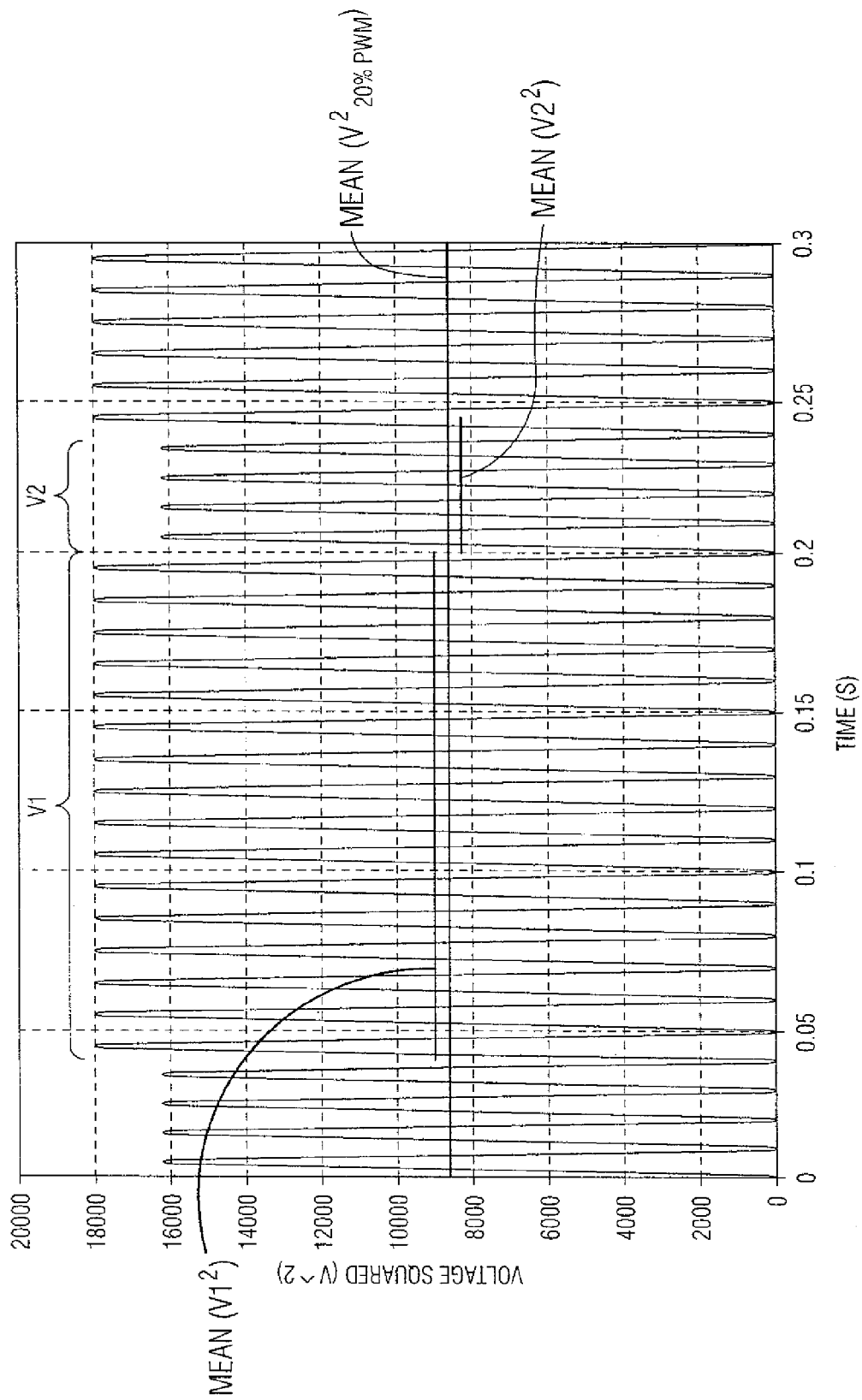
FIG. 3D illustrates a voltage waveform associated with the electrical circuits shown in FIGS. 3B and 3C according to one or more embodiments of the present disclosure.
Figure 3E:
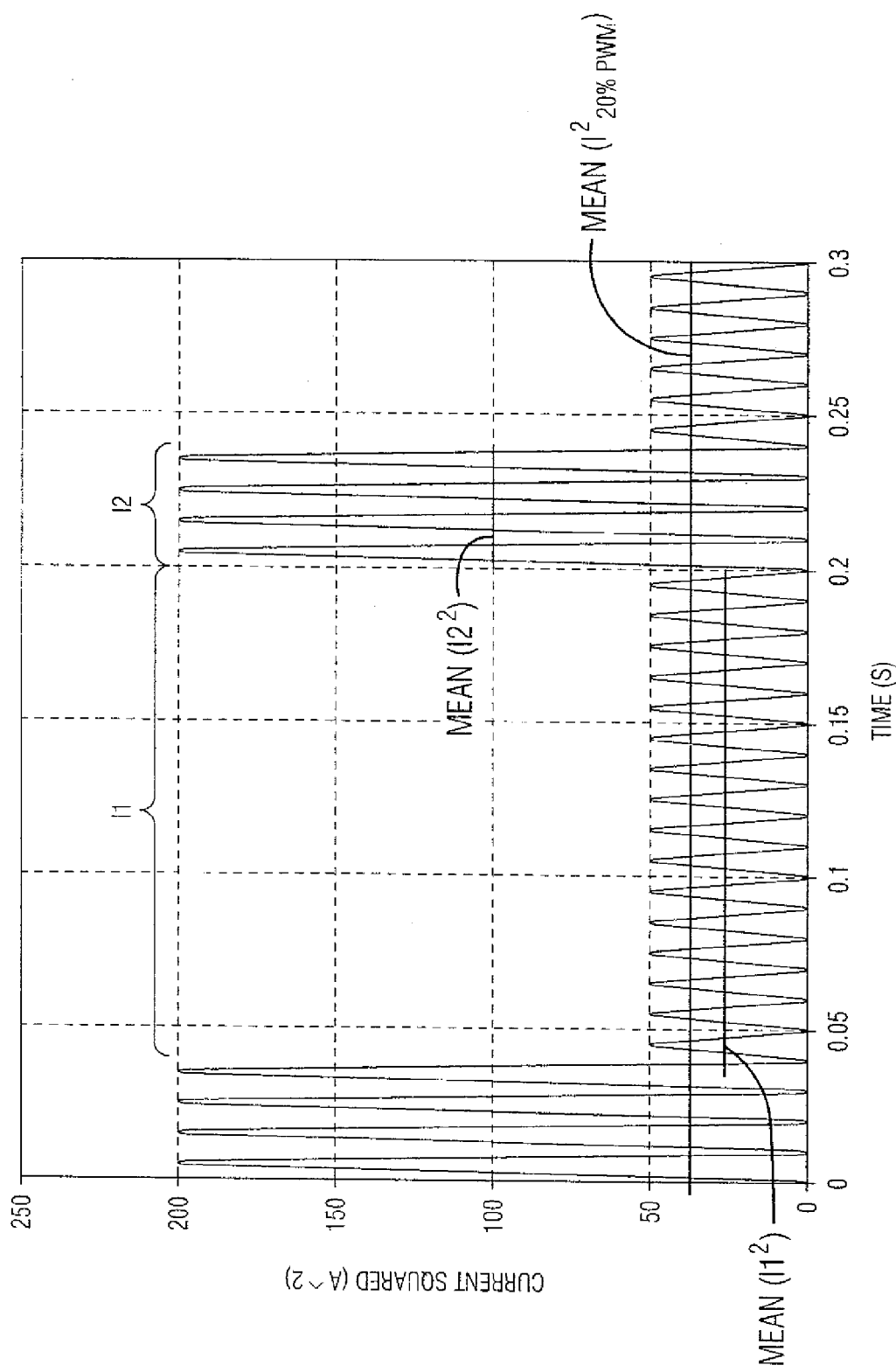
FIG. 3E illustrates a current waveform associated with the electrical circuits shown in FIGS. 3B and 3C according to one or more embodiments of the present disclosure.

FIGS. 3D and 3E respectively illustrate the square of voltage and current signals respectively, associated with the electrical circuits shown in FIGS. 3B and 3C according to one or more embodiments of the present disclosure. The respective waveforms are obtained at the input terminals of device 340, e.g., terminals 352 as shown in FIG. 3A, and represent the square of the actual signal magnitude. A period of time where the input voltage is at a higher level because the variable load ($R_V$) is not drawing power is indicated as V1 (corresponding to the circuit configuration illustrated in FIG. 3B), and another period of time where the input voltage is at a lower level is indicated as V2 (corresponding to the circuit configuration illustrated in FIG. 3C), e.g., variable load ($R_V$) is not drawing power. One skilled in the art will appreciate that waveform includes the V1 period 80% of the time, and includes the V2 period 20% of the time, as can be seen in FIG. 3D.

Using the square of the input voltage signal permits determining a non-zero mean for the certain periods of the waveform. The mean of the voltage squared waveform, e.g., mean ($V1^2$), during the time when the variable load ($R_V$) is not drawing power is shown for the period V1 having a value of 9,025 $V^2$, corresponding to an RMS value of 95.00 V, RMS. The mean of the voltage squared waveform, e.g., mean ($V2^2$), during the time when the variable load ($R_V$) is drawing power is shown for period V2 having a value of 8,840 $V^2$, corresponding to an RMS value of 94.02 V, RMS. And finally, the mean of the entire modulated waveform, e.g., mean ($V_{20\%}^2$), taken over the combined periods of V1 and V2, is shown having a value of 8,100 $V^2$, corresponding to an RMS value of 90.00 V, RMS.

FIG. 3E shows the corresponding current squared waveform annotated in a similar manner. The mean of the current squared waveform, e.g., mean ($I1^2$), during the time when the variable load ($R_V$) is not drawing power is shown for the period I1 having a value of 25.00 $A^2$, corresponding to an RMS value of 5.00 A, RMS. The mean of the current squared waveform, e.g., mean ($I2^2$), during the time when the variable load ($R_V$) is drawing power is shown for period I2 having a value of 100 $A^2$, corresponding to an RMS value of 10.00 A, RMS. Period I1 corresponds to period V1 shown on FIG. 3D, and period I2 corresponds to period V2 shown on FIG. 3D. And finally, the mean of the entire modulated waveform, e.g., mean ($I_{20\%}^2$), taken over the combined periods of I1 and I2, is shown having a value of 40.00 $A^2$, corresponding to an RMS value of 6.32 A, RMS.

Thus, one skilled in the art will recognize that conventionally, monitoring the pulse width modulated voltage and current signals would yield measurements of an RMS current having a magnitude of 6.32 Amps, and an RMS voltage of 94.02 Volts since the pulse width modulation switching between energized and de-energized states occurs during the measuring period used by the conventional instrumentation. Using values measured in this manner will lead to inaccurate characterizations of the AC Mains.

Referring once again to FIGS. 3B and 3C, although the values for the voltage source ($V_S$) 342 and line impedance ($R_L$) are shown in the FIGS. 3B and 3C, device 340 has to compute the AC mains circuit characteristic parameters from measurements it can make to have such information. Thus:

$$R_L = (V1-V2)/(I2-I1) = (95-94.02)/(6.32-5) = 0.742\ \text{Ohms}.$$

$$V_S = V1 + (I1 \times R_L) = 95 + (95 \times 0.742) = 98.71\,V, \text{RMS}$$

The reader will appreciate that the computed values are significantly different from the correct values of 1 ohm and 100 V, RMS shown in FIGS. 3B and 3C. The error is attributable to inherent error in the RMS measurements made with the variable load ($R_V$) being pulse width modulated, e.g., being rapidly turned on and off within the time over which the mean values are determined. The particular amount of error depends on the timing and duration of pulse width modulation; however, the reader will appreciate that error in the characterization of the AC mains circuit parameters will either lead to power under usage (inefficient), or power over usage (leading to failure due to low voltage).

Let the nomenclature below be defined for use in the equations that follow:

PWM=percentage of modulation (20% in this example)

$$I2\hat{\ }2 = I2\ \text{squared} = 6.32\hat{\ }2 = 40.00.$$

$$I1\hat{\ }2 = I1\ \text{squared} = 5.00\hat{\ }2 = 25.00.$$

During PWM, the variable load ($R_V$) is being switched in and out of the circuit. The following nomenclature is also defined:

I(20%)=I2 when switch 390 is modulated closed (e.g., 20% of the time in this example), and I(20%)=I(100%), e.g., if the switch 390 were closed all of the time.

I(80%)=I1 when switch 390 is modulated open (80% of the time in this example), e.g., the current drawn when $R_P$ is drawing power but $R_V$ is not.

According to one or more embodiments of the present invention, the inherent measurement error is removed by extrapolating the measured values, e.g., I2 and V2, taken at some percentage (X %) of PWM, e.g., 20% PWM in this example, to equivalent current and voltage values at 100% PWM. Then the equivalent 100% PWM current and voltage values are used in characterizing the AC mains circuit parameters. During PWM, the variable load ($R_V$) is being switch in and out of the circuit. The RMS value of $I_L$, e.g., 350 in FIG. 3A, is the square root of the average value of $I_L$ squared ($I_L{}^2$), which in turn is the weighted composite of $I(20\%)^2$ and $I(80\%)^2$. Therefore:

$$I_L{}^2=(I(20\%)^2 {*}PWM)+(I(80\%)^2 {*}(1-PWM)), \text{ where } PWM=0.2.$$

Thus:

$$I_L{}^2=(I(20\%)^2 {*}PWM)+(I1^2 {*}(1-PWM))$$

Rearranging:

$$I_L{}^2-(I1^2 {*}(1-PWM))=(I(20\%)^2 {*}PWM)$$

Isolating $I(20\%)^2$:

$$I(20\%)^2=[I2^2-(I1^2 {*}(1-PWM))]/PWM$$

Taking the square root of each side:

$$I(20\%)=I(100\%)=SQRT\{[I2^2-(I1^2 {*}(1-PWM))]/PWM\}$$

So:

$$I(100\%)=SQRT\{[40.00-(25.00{*}0.8)]/0.2\}=10.00$$

Likewise for the voltage:

$$V2^2=V2\text{ squared}=94.02^2=8840.$$

$$V1^2=V1\text{ squared}=95.00^2=9025.00.$$

During PWM, the variable load ($R_V$) is being switch in and out of the circuit. The following nomenclature is defined:

V(20%)=V2 when switch 390 is modulated closed (e.g., 20% of the time in this example), which is also equal to $V_L$ at 100% modulation when switch 390 is closed all the time, e.g., V(100%).

V(80%)=V1 when switch 390 is modulated open (80% of the time in this example).

Solving algebraically for V(100%) provides:

$$V(100\%)=SQRT\{[V2^2-(V1^2 {*}(1-PWM))]/PWM\}$$

So:

$$V(100\%)=SQRT\{[8840-(9025{*}0.8)]/0.2\}=90.00$$

And now the computed values at 100% modulation, extrapolated from the measured values at 20% modulation, are used to determine the characteristic AC mains circuit parameters. Therefore, the AC mains equivalent circuit impedance is:

$$R_L=(V1-V(100\%))/(I(100\%)-I1)$$

$$R_L=(95.00-90.00)/(10.00-5.00)=1.00 \text{ Ohms}.$$

And the AC mains equivalent source voltage is:

$$V_S=V1+(I1 \times R_L)$$

$$V_S=95.00+(5.00 \times 1.00)=100.00 \text{ V, RMS}$$

These are the expected values. Thus, errors in measurements of (RMS) values of characterizing electrical signals to a PWM load can be corrected by recognizing the relationship of a PWM modulated load as being a weighted average of on times at full load, and off times at zero load. In this manner, modulated characteristic electrical signals can be measured, and their values extrapolated to find an equivalent value "on" load value which can be used to further determine the AC mains circuit parameters accurately.

According to another aspect of the present invention, other loads on the same AC mains circuit are detected and compensated for in device power management schemes. AC mains circuit parameter characterization is determined so that variable loads of the device can be adjusted to draw a maximum amount of power available from the AC mains circuit without reducing input voltage below a preset limit, e.g., a limit below which certain components of the device may shutdown, fail or mis-operate. An AC mains circuit can include a number of electrical devices. For example, many electrical devices may be plugged into a typical branch electrical circuit. Similarly, many fluctuating or switched electrical loads may be loading a particular electrical supply transformer, or the utility source voltage energizing the supply transformer may otherwise change periodically due to any number of factors. Thus, the equivalent AC mains circuit parameters, e.g., source voltage and/or circuit impedance, may change over time.

Figure 3F:
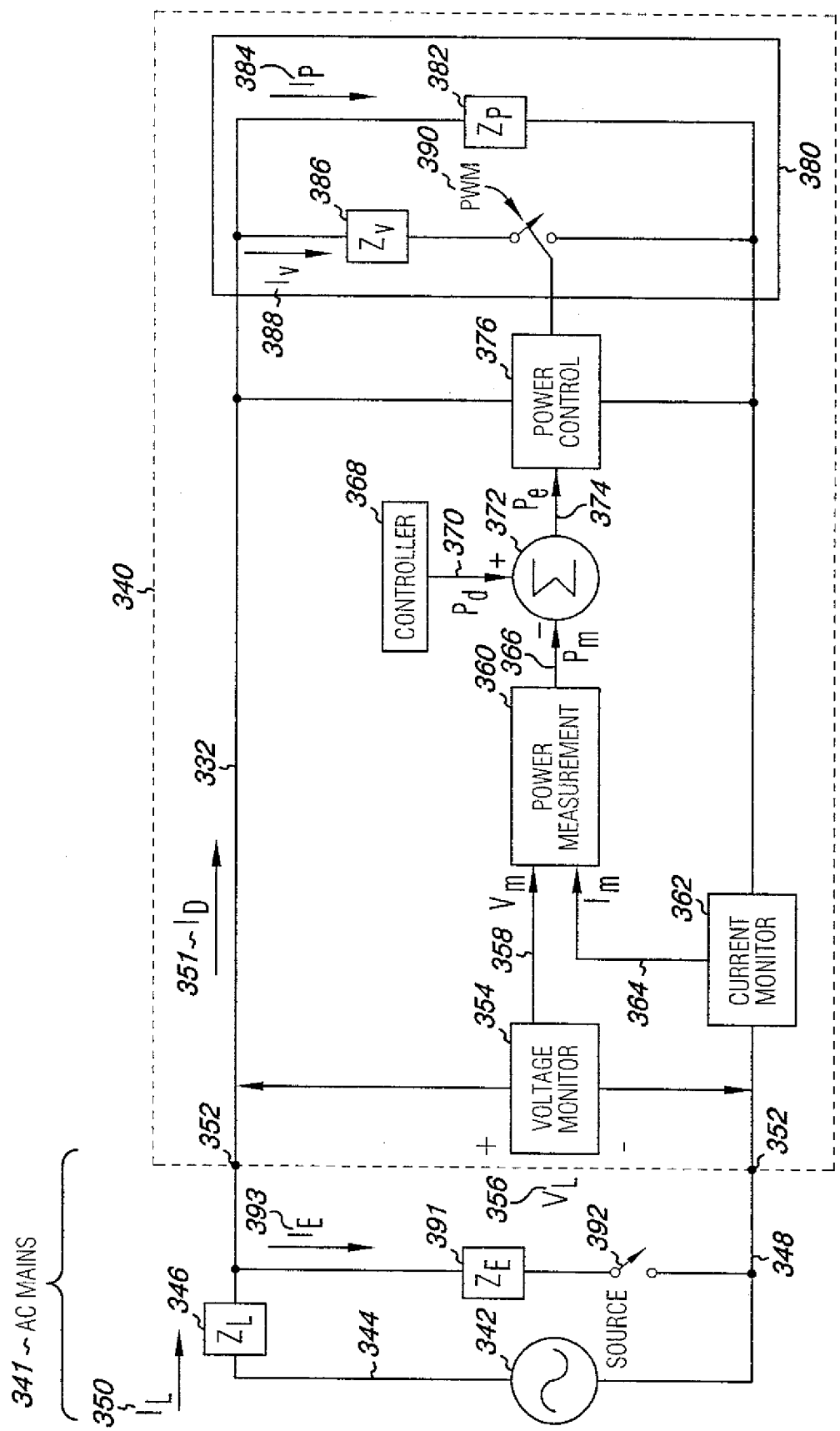
FIG. 3F illustrates an electrical diagram of another device having an image forming mechanism and connected to an AC mains serving an additional external electrical load according to one or more embodiments of the present disclosure.
Figure 3G:
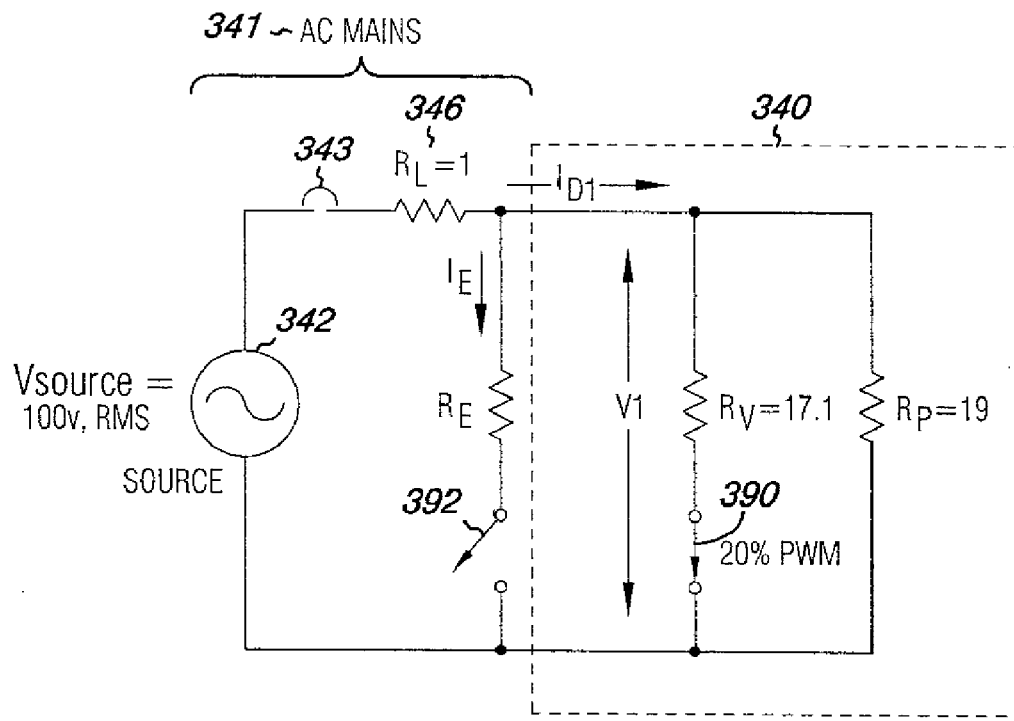
FIG. 3G illustrates a simplified electrical diagram of the device shown in FIG. 3F having an external load switched-out according to one or more embodiments of the present disclosure.
Figure 3H:
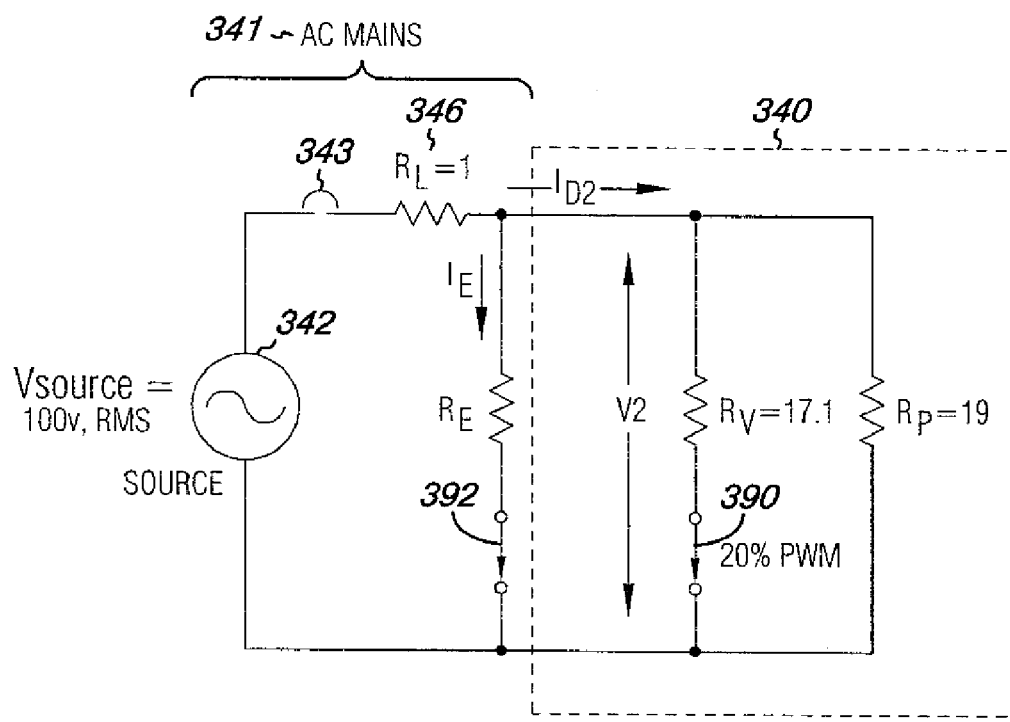
FIG. 3H illustrates another simplified electrical diagram of the device shown in FIG. 3F having an external load switched-in according to one or more embodiments of the present disclosure.

Accurate determination of AC mains circuit parameters is important to efficient use of available power, and in preventing inadvertent device shutdown by over use of power from the AC mains circuit, e.g., causing low voltage or by tripping the device or tripping the AC mains protective equipment such as a branch circuit breaker, e.g., breaker 343 in FIGS. 3G and 3H. It is desirable to avoid these events and conditions. One prior approach determined AC mains circuit resistance once, e.g., at start-up, and thereafter assuming AC mains circuit resistance remained constant. Changes in AC mains voltage were attributed to changes in the AC mains source voltage. Effectively, the previous approach assumed a dedicated circuit was supplying the device; however, this was a significant limitation since another load on the AC mains circuit could result in enough current being drawn to trip the branch circuit breaker, e.g., 343, for example.

Another previous approach assumed that a change in the AC mains circuit voltage, not caused by the device itself, is due to another device on the same circuit rather than a change in the AC mains source voltage. However, this universal assumption can also lead to errors in AC mains circuit parameters, specifically, overcompensation for voltage changes that are actually due to changes in the source voltage rather than due to another device on the same AC mains circuit.

FIG. 3F illustrates an electrical diagram of another device having an image forming mechanism according to one or more embodiments of the present disclosure, the device being connected to an AC mains serving additional external electrical loads. FIG. 3F is similar to the circuit shown in FIG. 3A, except that the AC mains circuit, from the perspective of the device 340, includes another external load impedance, e.g., $Z_E$ 391. The external load impedance $Z_E$ 391 is shown being energized through switch 392 to represent the external load being changeable. Current $I_E$ 393 flows through $Z_E$ 391 when energized. One having ordinary skill in the art will appreciate other configurations are possible for loading the AC mains circuit in different ways; however, aspects of the present invention will be understood from a simple example, and can be applied to accommodate other AC mains circuit configurations.

FIG. 3G illustrates a simplified electrical diagram of the device shown in FIG. 3F having an external load switched-out according to one or more embodiments of the present disclosure. Thus, considering first, the configuration of switch 392 being open, yields the results as discussed with regard to FIGS. 3A-3C above. Device 340, e.g., an image forming device such as a printer or copier, acquires two sets of voltage and current measurements by operating, e.g., modulating, a variable load at two different power levels, e.g., 0% and X %. As discussed above, device 340 might obtain first voltage and current measurements under minimum load conditions, e.g., V1 and $I_{D1}$ in FIG. 3G corresponding to V1 and I1 respectively as shown in FIG. 3B, and obtain second voltage and current measurements under higher load conditions, e.g., V1 and $I_{D2}$ in FIG. 3H corresponding to V2 and I2 respectively as shown in FIG. 3B. However, embodiments of these aspects of the present invention are not limited to loading the AC mains circuit using a PWM modulated load, e.g., as shown in FIGS. 3A-3C, and may use a fixed load or a load switched by modulated by other switching apparatus or technique. Utilizing the measured characterizing electrical signals, the AC mains circuit parameters, e.g., source voltage and circuit impedance, may be determined:

$$R_L=(V1-V2)/(I2-I1)$$

$$V_S=V1+(I1\times R_L)$$

FIG. 3H illustrates another simplified electrical diagram of the device shown in FIG. 3F having an external load switched-in according to one or more embodiments of the present disclosure. Assuming now that switch 392 is closed subsequent to the initial AC mains parameters characterization, thus adding some additional load, e.g., external load impedance $R_E$, (corresponding to $Z_E$ 391 in FIG. 3F), to the AC mains circuit, and causing voltage $V_L$ 356 at the terminals 352 of device 340, e.g., voltage V2 in FIG. 3H, to change with respect to the switch 392 open configuration. Current $I_E$ flows through $R_E$, and also through $R_L$ causing the additional drop in voltage to device 340. Through voltage monitor 354, device 340 detects the change to voltage $V_L$ 356, e.g., V2 in FIG. 3H. Since the voltage V2, e.g., $V_L$ 356 in FIG. 3F, change was due to the external load addition $R_E$, e.g., external load impedance $Z_E$ 391 in FIG. 3F, rather than some internal change or operation by device 340, a new characterization of the AC mains circuit parameters is initiated according to one embodiment of the present invention. Alternatively, AC mains circuit parameter re-characterization could be implemented on a periodic, ongoing, or continuous, basis.

According to a previous approach, AC mains re-characterization is accomplished by obtaining new measurements of characterization electrical signals, e.g., voltage and current, e.g., V3 and I3. Since the AC mains circuit resistance is assumed to be constant in one previous approach, the new voltage and current pair, e.g., V3 and I3, is used in conjunction with the original minimum load measurements, e.g., V1 and I1, to re-determine the source voltage:

$V_S=V3+(I3\times R_L)$, where $R_L$ remains as previously determined. Reusing the original minimum load data avoided having to constantly cycle the variable load used to sag the AC mains circuit for testing during operations of the device. Assuming $R_L$ remains unchanged may be true for a dedicated AC mains circuit; however, the reader will appreciate it is not true in this example (and is frequently not true in actual use of device 340) and will lead to inaccurate power management decisions based on the inaccurate $R_L$, as will be apparent from the following example (refer to FIG. 3F) and assuming the following conditions:

Vsource=120 V
$Z_L$=0.5 ohms
$Z_E$=10 ohms

Where another load is added to the AC mains, the AC mains circuit parameters, e.g., source voltage and circuit impedance, will change at the terminals 352 of device 340 according to the following:

Vnew=new AC mains source voltage
Znew=new AC mains circuit impedance, e.g. resistance
where:

$$V\text{new}=V\text{source}*[Z_E/(Z_L+Z_E)]$$

$$Z\text{new}=Z_L*[Z_E/(Z_L+Z_E)]$$

Quantifying the changes:

$$V\text{new}=120*[10/(0.5+10)]=114.3\text{ V}$$

$$Z\text{new}=0.5*[10/(0.5+10)]=0.476\text{ ohms}$$

If device 340 has a maximum current, e.g., Imax, rating of 20 A, and can operate down to a voltage, e.g., Vmin, of 96 V, given the re-characterized AC mains circuit parameters, e.g., Vnew and Znew, the test voltage (Vt) at terminals 352 at maximum current draw is:

$$Vt=V\text{new}-(I\text{max}\times Z\text{new})=114.3-(20*0.476)=104.8\text{ V}$$

which is well above the Vmin of 96 V at which device 340 can operate. Thus, device 340 determines it is safe to draw the maximum current, e.g., Imax, of 20 A. However, the added external load draws current as well, e.g., $I_E=V_L/R_E$. Total current flowing through line 344 (and presumably through a branch circuit breaker, e.g., 343 in FIGS. 3G and 3H, or other protection device) is the sum of the current through the external load ($I_E$) plus the current through the device ($I_D$);

$$I_L=I_E+I_D$$

$$I_E=V_L/Z_E$$

$$I_L=(V\text{new}-V_L)/Z_L$$

Rearranging:

$$I_L*Z_L=(V\text{new}-V_L)$$

Thus:

$$V_L=V\text{new}-(I_L*Z_L)$$

Substituting for $V_L$:

$$I_E=[V\text{new}-(I_L*Z_L)]/Z_E$$

Substituting for $I_E$;

$$I_L=\{[V\text{new}-(I_L*Z_L)]/Z_E\}+I_D$$

Collecting like terms:

$$I_L[1+(Z_L/Z_E)]=(V\text{new}/Z_E)+I_D$$

Solving for $I_L$:

$$I_L=[(V\text{new}/Z_E)+I_D]/[1+(Z_L/Z_E)]$$

Simplifying:

$$I_L=[V\text{new}+(I_D*Z_E)/(Z_E+Z_L)$$

Substituting values:

$$I_L=[120+(20*10)/(10+0.5),\text{ where }I_D=I\text{max}=20\text{ A}$$

Solving:

$$I_L=30.5\text{ A}$$

If the branch circuit protective device, e.g., circuit breaker 343, is rated for the maximum current, e.g., 20 A, of device 340, it may eventually trip the entire circuit, e.g., device 340 and the external load as well.

According to one or more embodiments of the present invention, the above-described undesirable results can be avoided by re-characterizing the AC mains circuit impedance when some magnitude of change, e.g., exceeding a selected value, percentage or other threshold characteristic of change, is determined in the AC mains circuit equivalent source voltage, e.g., change in a re-characterized source voltage exceeds a certain magnitude. In the example set forth above, device 340 determined a change in the AC mains circuit equivalent source voltage from 120 V to 114.3 V, e.g., Vnew, not attributable to an internal load change, e.g., due to addition of a new external load ($Z_E$). According to another embodiment, a change in line voltage, e.g., $V_L$, triggers re-characterization of AC mains circuit parameters, including line impedance ($Z_L$). Such a change in line voltage can include exceeding a selected value, percentage, or other threshold change characteristic.

Such a change in AC mains circuit equivalent source voltage (or alternatively $V_L$) triggers a new set of minimum load measurements which are used in re-characterizing the AC mains circuit parameters (rather than using the previous, e.g., original, minimum load measurements). Doing so will result in determining the new (and correct) line impedance ($Z_L$), a change from 0.5 ohms to 0.467 ohms in the example above, thus device 340 ascertains that the change in the terminal voltage, e.g., $V_L$, was not due to a change in source voltage. Device 340 may be programmed to recognize changes in AC mains circuit parameters as being indicative of external load changes, from which the magnitude of the external load changes can be determined, and used to adjust the maximum power, e.g., by adjusting Imax, device 340 may draw to avoid exceeding AC mains circuit limitations, e.g., avoid tripping a branch circuit breaker, e.g., 343 in FIGS. 3G and 3H.

According to one embodiment of the present invention, after re-characterizing the AC mains circuit parameters, device 340 may then determine AC mains circuit source voltage on a periodic, ongoing, and/or continuous basis until another change to source voltage is determined, e.g., due to an external load being added or removed from the AC mains circuit. Monitoring in this way for AC mains circuit equivalent voltage source changes, utilizing the latest minimum load measurements of characterizing electrical signals (rather than the original minimum load measurements), does not have to utilize periodic, ongoing or continuous cycling of the loads of device 340, e.g., to a minimum load configuration. Upon detecting another source voltage change, device 340 may then trigger re-characterization of AC mains circuit parameters once again, including line impedance. In this way, device 340 can be made to automatically adapt to changing AC mains circuit configuration conditions, as well as changing source voltage conditions.

One skilled in the art will recognize the attributes of various embodiments of the present invention. Nuisance branch circuit protective device trips may be avoided or minimized using the adaptive techniques when device 340 is on an AC mains circuit along with other loads. Adaptation to changing AC mains circuit conditions, e.g., changing external load configurations, is achieved with minimal cycling to minimum load, thus efficiently managing loading circumstance which might otherwise lead to excessive flicker, and other circuit regulation issues. The reader will appreciate that distinguishing between line voltage changes due to certain source voltage changes and/or induced by other loads on the AC mains circuit, can lead to more efficient and accurate power management techniques.

According to another embodiment of the present invention, measurements of AC mains characterizing electrical signals are taken so as not to introduce errors into the characterization of the AC mains circuit parameters, for example during device quiet times. Device quiet times are periods during which device loads, other than loads used for testing the AC mains, are stable. One having ordinary skill in the art will appreciate that an electrical device, e.g., an image forming device, can characterize AC mains circuit parameters, e.g., equivalent source voltage and circuit impedance, by measuring characterizing electrical signals, e.g., voltage at the device and current to the device, under at least two (2) different load configurations. Extraneous loads, be they internal or external to the device, that turn on or off during, or between, these measurements can cause significant errors in determining the AC mains characterizing parameters. Therefore, coordinating measurements of AC mains characterizing electrical signals with other fluctuating loads within the device can eliminate associated errors from being introduced into the measurements, leading to more accurate AC mains parameter characterizations.

AC mains circuit parameter characterization has a measurement phase during which characterizing electrical signals, e.g., voltage and current, are measured. Fluctuating loads of a device during these measurements can look like noise with respect to the measured signals, depending on the magnitude, duration, and other properties of the fluctuations. For example, small magnitude internal load changes of short duration occurring while a relatively larger test load is being used to load the AC mains for characterization measurements, might appear as noise on the measured characterizing electrical signals. It is advantageous to conduct AC mains circuit parameter characterization typically just after device power-up, e.g., near device start-up. During device start-up however, the device may be warming-up, and going through various checks requiring energization of various internal components and operations, which are subsequently de-energized following start-up testing, e.g., the device is placed in a ready mode. Some or all of such rapid energizations/de-energizations during start-up may appear as noise impressed on the AC mains circuit. Previous approaches utilized extensive signal averaging to reduce measurement noise, requiring additional time and processing bandwidth be devoted to signal averaging.

Figure 3I:
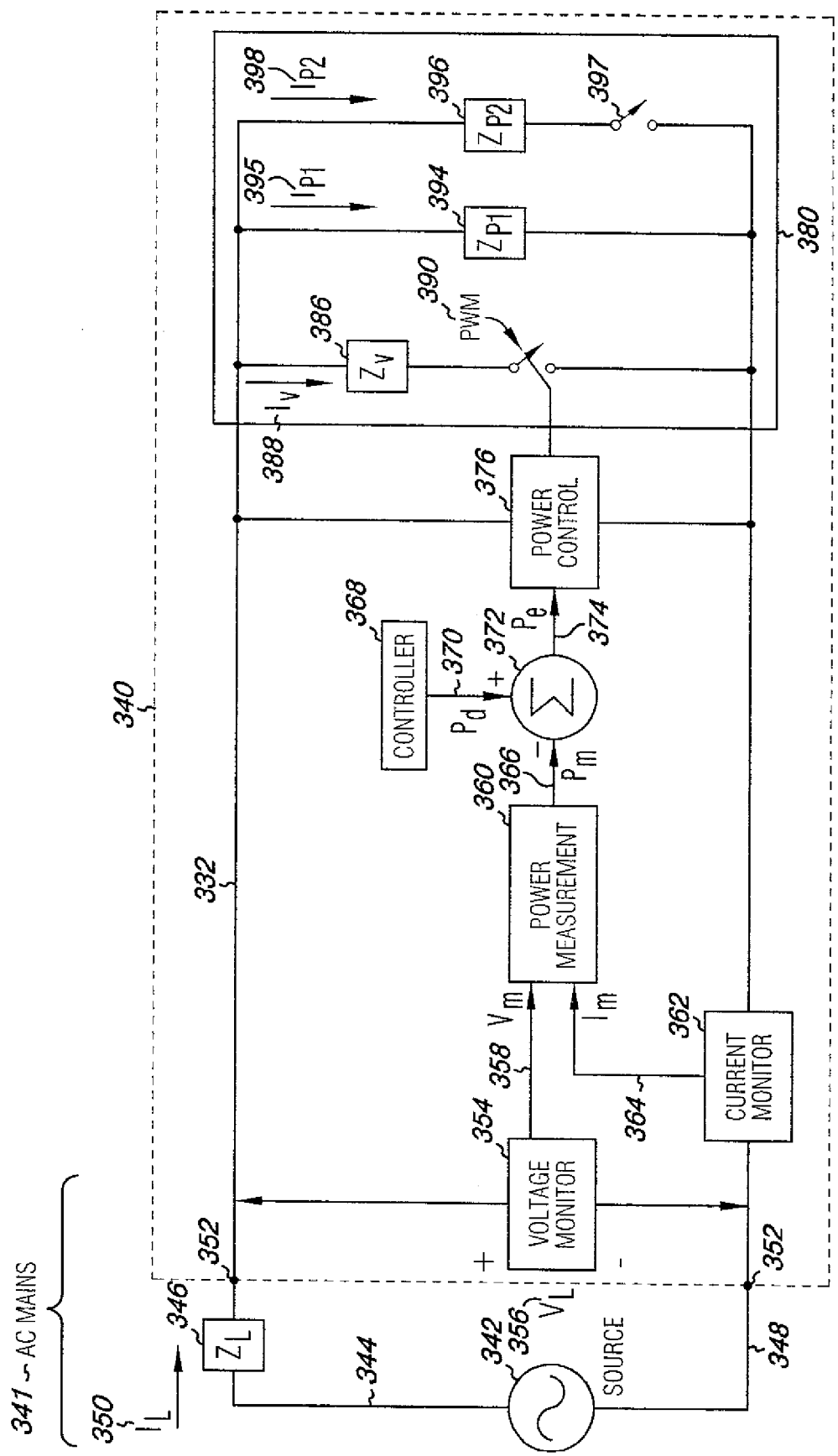
FIG. 3I illustrates an electrical diagram of a device having an image forming mechanism including multiple switched loads and connected to an AC mains according to one or more embodiments of the present disclosure.

FIG. 3I illustrates an electrical diagram of a device having an image forming mechanism including multiple switched internal loads according to one or more embodiments of the present disclosure, the device being connected to an AC mains. FIG. 3I is similar to the circuit shown in FIG. 3A, except that the device 340 includes an image forming mechanism 380 having a switched product load, e.g., $Z_P$ in FIG. 3A. The product load shown in FIG. 3I is made up of a fixed first load impedance, e.g., $Z_{P1}$ 394, and a switched second load impedance, e.g., $Z_{P2}$ 396. Load impedance $Z_{P2}$ 396 is connected through switch 397. A first product current, e.g., $I_{P1}$ 395, flows through $Z_{P1}$ 394 when energized, and a second product current, e.g., $I_{P2}$ 398, flows through $Z_{P2}$ 396 when energized, i.e., when switch 397 is closed. While one switched and one fixed product load are shown in FIG. 3I, embodiments of the present invention are not so limited. The product loads may be all switched loads, and there may be more or fewer of each of the fixed and switched product loads than are shown in FIG. 3I. $Z_{P1}$ 394 and $Z_{P2}$ 396 may individually be large or small loads, or some combination thereof, and switch 397 may operate fast, slow, or even in a modulating fashion. Switch 397 is representative of a switching function, and need not be a mechanical switch, and may be any appropriate switching apparatus including electronic switch (es) as will be known by those having skill in the art.

According to one or more embodiments of the present invention, measuring of AC mains circuit parameters characterizing electrical signals, e.g., voltage and current, are coordinated with other internal load changes, for example by a controller(s) implementing the AC mains circuit parameters characterization and/or other process(es) resulting in other internal load changes. In example, during the period, e.g., 5 to 34 seconds, prior to AC mains characterization, a printer may initialize its vacuum hold down subsystem, the vacuum hold down subsystem being a relatively large fluctuating load which causes corresponding relatively large fluctuations in the AC mains to the printer. A controller, e.g., processor, is controlling both the vacuum hold down subsystem initialization and the AC mains circuit parameters characterization, and is thus able to coordinate the two processes appropriately (alternately, separate controllers may be in communication with one another to effect coordination).

Since the characterization task applies at least one load to sag the AC mains circuit voltage (the other load point may be at a zero loading configuration), the controller performs the task in parallel with the vacuum hold down subsystem initialization. However, the controller delays measuring the AC mains circuit parameters characterizing electrical signals until the vacuum hold down subsystem initialization is finished. Thereafter, one or more measurements of AC mains circuit parameters characterizing electrical signals, e.g., voltage and current, are made. In this manner, AC mains circuit parameters characterizing electrical signals measurement is made independent of internal fluctuating loads, thereby improving measurement accuracy with minimal delay.

Figure 3J:
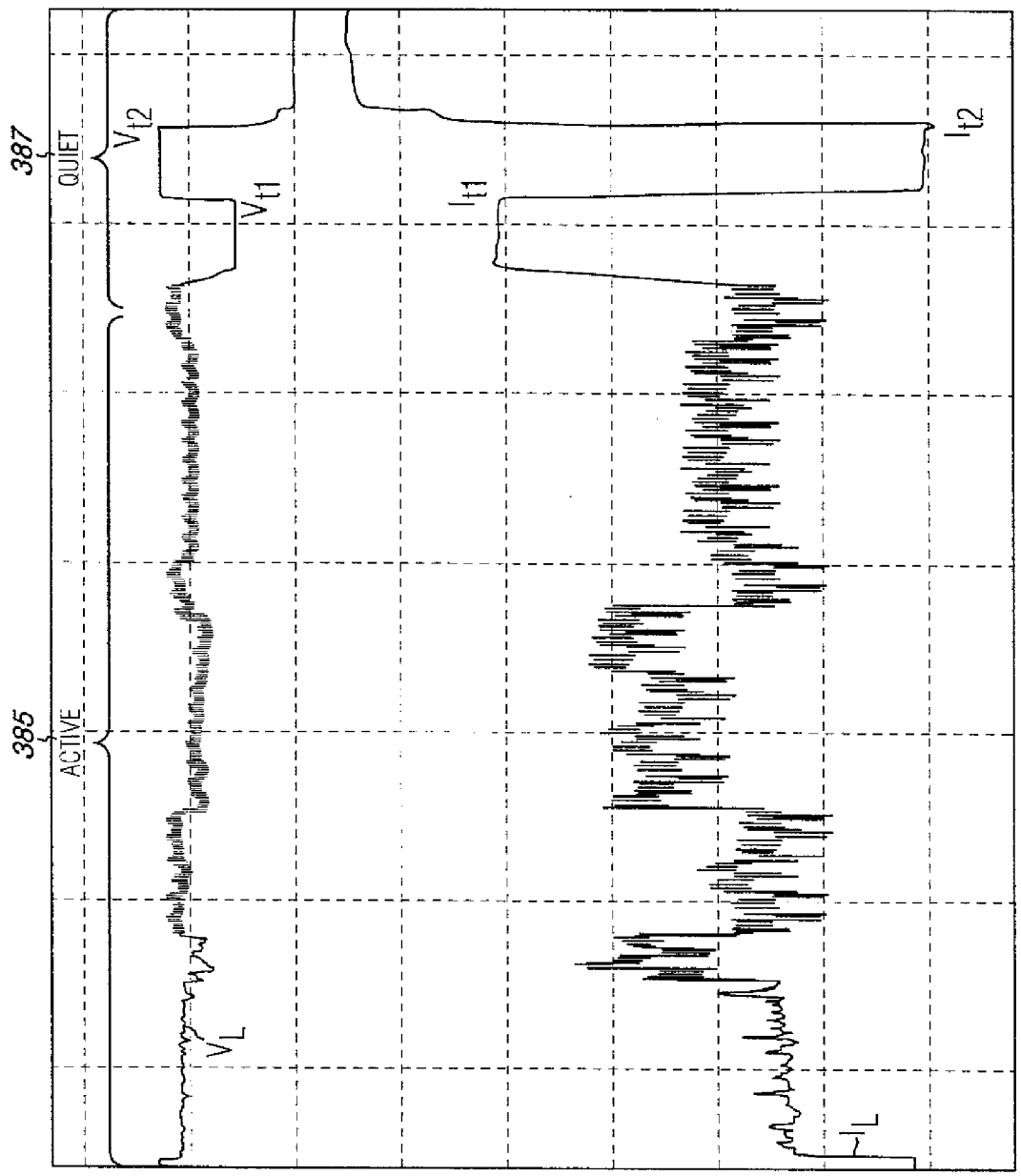
FIG. 3J illustrates current and voltage waveforms associated with an image forming mechanism during a start-up sequence according to one or more embodiments of the present disclosure.

FIG. 3J illustrates current and voltage waveforms associated with an image forming mechanism during a start-up sequence according to one or more embodiments of the present disclosure. One skilled in the art will recognize an initial active period 385 having relatively noisy line voltage ($V_L$) and current ($I_L$) signals as various sub-systems and/or components are cycled through testing, warm-up and other configurations. The noisy active period 385 may be followed by a rather quiet period 387 after initial warm-up and testing is complete. During the quiet period 387, one or more load conditions, e.g., a first load condition having voltage Vt1 and current It1, and a second load condition having voltage Vt2 and It2, can be applied and measured in characterizing the AC mains.

According to one or more other embodiments of the present invention, measurement of electrical signals for characterizing AC mains circuit parameters may be made independent of internal fluctuating loads in other ways besides during a continuous period of quiet time, e.g., steady loading other than the load changes associated with sagging the AC mains circuit for purposes of establishing a second loading configuration at which to measure. The measurements can be arranged to coincide with at least two different known load configurations, the different load configurations being held constant at least during the measurements. For example, a first measurement can be made, followed by a period of fluctuating load changes due to other function being performed, e.g., start-up operations, which ultimately cease returning the device to a quiet state, at which time a second measurement of characterizing electrical signals can be made. According to other embodiments, some load changes after a first measurement at minimal load configuration, can be occurring and be accounted for in subsequent measurements. Although a single variable modulating load is illustrated in the examples discussed herein, loading may be accomplished using multiple loads, including combination of fixed and variable, e.g., PWM modulated, loads. One skilled in the art will appreciate accounting for various loads being used during measurements, and the advantages to coordinating internal loading configurations to avoid internal load changes during measurement of AC mains circuit characterizing electrical signals.

As one of ordinary skill in the art will understand, embodiments of the present invention can be performed by hardware, or software/firmware (e.g., computer executable instructions) operable on the devices shown herein or otherwise. The disclosed subject matter, however, is not limited to any particular operating environment or to software written in a particular programming language. Software, application modules, and/ or computer executable instructions, suitable for carrying out embodiments of the present invention, can be resident in one or more devices or locations or in several and even many locations.

Embodiments of the invention can also reside on various forms of computer readable mediums. Those of ordinary skill in the art will understand from reading the present disclosure that a computer readable medium can be any medium that contains information that is readable by a computer. Forms of computer readable mediums can, for example, include volatile and/or non-volatile memory stored on fixed or removable mediums, such as hard drives, disks, computing devices, and the like, among others.

Unless explicitly stated herein, method embodiments described herein are not constrained to a particular order or sequence. Additionally, some of the described method embodiments or elements thereof can occur or be performed at the same point in time.

Although specific embodiments have been illustrated and described herein, those of ordinary skill in the art will appreciate from reading the present disclosure that any arrangement calculated to achieve the same techniques can be substituted for the specific embodiments shown. This disclosure is intended to cover any and all adaptations or variations of various embodiments of the invention.

It is to be understood that the above description has been made in an illustrative fashion, and not a restrictive one. Combination of the above embodiments, and other embodiments not specifically described herein will be apparent to those of ordinary skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An image forming device, comprising
   a variable electrical load;
   a controller adapted to vary the electrical load based on a characterization of AC mains circuit parameters including source voltage and line impedance; and
   wherein line impedance is determined from characterizing electrical signals measured at a minimal load configuration after determining a change in source voltage.

2. The image forming device of claim 1, wherein the electrical load is controlled based on the characterization to prevent a maximum current draw from the AC mains circuit from causing predicted input voltage to fall below a preset limit.

3. The image forming device of claim 2, wherein the maximum current draw is adjusted based on the line impedance determined after the change in source voltage.

4. The image forming device of claim 3, wherein source voltage is determined when voltage at the image forming device changes by a preset amount not caused by load changes internal to the image forming device.

5. A method of characterizing AC mains circuit parameters, comprising:
   measuring root mean square (RMS) values of characterizing electrical signals to a pulse width modulated (PWM) load at a first load;
   measuring RMS values of characterizing electrical signals to the PWM load at a second PWM load;
   extrapolating the RMS values of characterizing electrical signals for the PWM load at the second PWM load, to values for a PWM load at third PWM load; and
   determining AC mains circuit parameters using changes in RMS values of characterizing electrical signals between PWM loading at the first load and the third PWM load.

6. The method of claim 5, wherein:
   RMS values of characterizing electrical signals to the PWM load at first PWM load are a weighted composite equal to X % of the RMS values to the PWM load at full load plus (100-X) % of the RMS values for the PWM load at first load;
   extrapolating includes solving the weighted composite equality for the RMS values at full PWM load; and
   wherein X is the percent modulation at the second PWM load.

7. The method of claim 6, wherein characterizing electrical signals include input current and voltage.

8. The method of claim 7, wherein AC mains circuit parameters determined includes source voltage and AC mains circuit impedance.

9. The method of claim 8, wherein the method includes:
   monitoring the input voltage; and
   repeating the measuring, extrapolating, and determining steps based on a change in the input voltage exceeds a threshold.

10. The method of claim 9, wherein the method includes adjusting the PWM load based on the AC mains circuit parameters.

11. The method of claim 10, wherein the method includes adjusting the PWM load based on drawing a maximum amount of power available from the AC mains circuit without reducing input voltage below a preset limit.

12. The method of claim 7, wherein X is as large as possible in the range between 0 and 100 without reducing input voltage below a preset limit during measuring.

13. The method of claim 6, wherein the measuring steps are arranged to occur during a period with no net load changes other than PWM load changes.

14. A device, comprising:
    at least some pulse width modulation (PWM) electrical load;
    a controller for characterizing AC mains circuit parameters and modulating the PWM electrical load based on the characterization; and
    wherein the characterization includes:
       measuring root mean square (RMS) electrical signal values to the device at 0% PWM loading and X % PWM loading, X being greater than 0;
       determining RMS electrical signal values at 100% PWM loading from the measured RMS electrical signal values; and
       solving for AC mains circuit parameters from the change in RMS electrical signal values from 0% to 100% PWM loading.

15. The device of claim 14, wherein RMS electrical signals values include input current and voltage.

16. The device of claim 15, wherein the PWM electrical load is modulated based on the characterization to prevent total power draw from the AC mains circuit from causing predicted input voltage to fall below a preset limit.

17. The device of claim 16, wherein the device includes a computing component, and the preset limit is above an input voltage which can provide a minimum operating voltage to the computing component.

18. The device of claim 15, wherein:
    AC mains circuit parameters characterized includes source voltage and circuit impedance; and
    characterization of AC mains circuit parameters occurs after power-up of the device, and after the input voltage changes by a set amount not caused by the device.

19. The device of claim 15, wherein:
    AC mains circuit parameters characterized includes source voltage and circuit impedance;
    an initial characterization of AC mains circuit parameters occurs after power-up of the device;
    re-characterization of AC mains source voltage occurs on a periodic basis based on updated measurement of RMS electrical signal values to the device at X % PWM loading and a last measurement of RMS electrical signal values to the device at 0% PWM loading; and
    re-characterization of AC mains circuit impedance, based on updated measurement of RMS electrical signal values to the device at 0% PWM loading, occurs after change in the re-characterized source voltage exceeds a certain magnitude.

20. The device of claim 19, wherein the PWM electrical load is a component of an image forming mechanism to form an image on media.

21. The device of claim 15, wherein measuring at X % PWM loading is arranged to exclude load changes of the device not attributable to the change in PWM loading from 0% PWM.

22. The device of claim 15, wherein measuring at X % PWM loading is arranged to occur when total device loading is equal to a total device loading at 0% PWM loading plus changes in the PWM electrical load.

23. The device of claim 22, wherein the PWM electrical load is selected from the group including:
    a print media dryer;
    a media marking mechanism; and
    a vacuum hold-down system.

24. An image forming device, comprising
    a variable electrical load;
    a controller adapted to vary the electrical load based on at least two AC mains circuit characterizing electrical signals measurements, wherein the electrical signals measurements include source voltage and line impedance; and wherein the measurements are arranged to coincide with at least two different known load configurations, wherein at least one load configuration is a minimal load configuration, the different load configurations being held constant at least during the measurements, and wherein line impedance is determined from characterizing electrical signals measured at the at least one minimal load configuration after determining a change in source voltage.

* * * * *